United States Patent [19]

Baker et al.

[11] Patent Number: 5,654,959
[45] Date of Patent: Aug. 5, 1997

[54] ACCESS POINT FOR MOBILE WIRELESS NETWORK NODE

[75] Inventors: Murray C. Baker, Toronto; Roger Y. M. Cheung, Scarborough; Charles E. Perkins, Ossining; Peter E. Reissner, Belleville, all of Canada

[73] Assignee: International Business Machines Corporation, Armonk, N.Y.

[21] Appl. No.: 506,273

[22] Filed: Jul. 24, 1995

[30] Foreign Application Priority Data

Jul. 29, 1994 [CA] Canada ................... 2129200

[51] Int. Cl.⁶ .................. H04Q 7/22; H04Q 7/32; H04Q 7/38
[52] U.S. Cl. .................. 370/331; 455/418; 395/200.02; 370/913
[58] Field of Search .................. 370/85.13, 85.7, 370/85.14, 94.1, 95.1, 53, 54, 55, 58.1, 58.2, 58.3, 60, 60.1; 395/200.01, 200, 200.1, 200.15, 200.2; 379/59, 60; 455/33.1, 33.2

[56] References Cited

U.S. PATENT DOCUMENTS

| 5,181,200 | 1/1993 | Harrison | 370/85.1 |
| 5,276,680 | 1/1994 | Messenger | 370/85.1 |
| 5,295,154 | 3/1994 | Meier et al. | 370/60 |
| 5,371,738 | 12/1994 | Moelard et al. | 370/85.1 |
| 5,490,139 | 2/1996 | Baker et al. | 370/60 |

FOREIGN PATENT DOCUMENTS 0 483 544 A1   5/1992   European Pat. Off. .

Primary Examiner—Douglas W. Olms
Assistant Examiner—Matthew C. Phillips
Attorney, Agent, or Firm—Joscelyn G. Cockburn

[57] ABSTRACT

An internetworking node for providing internetworking services for mobile wireless nodes is disclosed. Each mobile wireless node is associated with at the most one internetworking node. Each mobile wireless node selects which internetworking node it will associate with. The internetworking node will then act for all wireless nodes associated to it in relaying messages between wireless nodes or between a wired LAN and the wireless nodes. A tracking mechanism for such a system which maintains a table of all the internetworking nodes the wireless node has recently heard and deleting all such internetworking nodes which have not been heard recently is disclosed. A switching mechanism for such a system for determining when the wireless mobile node should switch its association from one internetworking node to another is also disclosed. The switching mechanism determines whether a particular internetworking node overheard by the mobile wireless node has been heard recently, and if not will associate with such an internetworking node. Otherwise the wireless node maintains its current association, with a particular internetworking node until a failure to communicate occurs or the said tracking mechanism deletes its reference to the said internetworking node.

19 Claims, 10 Drawing Sheets

ACCESS POINT FOR MOBILE WIRELESS NETWORK NODE

CROSS-REFERENCE TO RELATED APPLICATIONS

This patent application is related to the applications titled, METHOD AND APPARATUS FOR CONNECTING A WIRELESS LAN TO A WIRED LAN, and ACCESS POINT TRACKING FOR MOBILE WIRELESS NETWORK NODE, both filed concurrently herewith, the disclosures of which are hereby incorporated by reference.

FIELD OF THE INVENTION

This invention pertains to wireless networks generally, and means for connecting wireless nodes or wireless LANs to wired LANs in particular.

BACKGROUND OF THE INVENTION

Local Area Networks (LANs) have historically consisted of nodes interconnected by physical telecommunications media (eg, coaxial cable, twisted pair wire, or fiber optics). We shall refer to such LANs as wired LANs.

Recently wireless LANs, the nodes of which are not connected by means of a physical medium, have started to appear in the market. These wireless LANs communicate by means of infra-red (IR), radio or other signals. One of the benefits of using wireless LANs is that cabling is not required. This is a particularly useful feature for mobile nodes such as laptop and notebook computers, PDAs (personal digital assistants), and the like. If appropriately equipped with an appropriate wireless adapter (which includes a transmitter/receiver and control card), such as an IR wireless Adapter, the mobile nodes can move around and remain connected to the network, provided they do not move out of range.

It is advantageous to allow each wireless node to communicate directly with other nodes, as is the case in most wired LANs. In a wireless LAN which permits this, the wireless adapter and controlling software transmit data packets which all nodes within range can hear. This permits transmitting of packets which are received but ignored by all nodes except the one(s) to which they are addressed. This parallels the packet delivery systems of such wired LAN protocols as Ethernet. Thus, upper level network operating system software, which relies on a packet delivery system such as Novell Corporation's NETWARE (tm) can be used with such a wireless LAN. We shall refer to such a wireless LAN as a Peer-to-Peer Wireless LAN.

There is an important physical characteristic in a peer-to-peer wireless LAN that makes it very difficult to build a reliable network compared to a wired LAN. In a wired LAN, every network node is physically connected to the network and can therefore access all of the network traffic. This is often not the case with wireless LANs. Each node communicates with other nodes by means of some form of electromagnetic signal, the range of which will be limited. Each node will have an area of coverage which will be limited by such factors as type of signal, signal strength, obstacles within range, etc. In the wireless LAN, it cannot be guaranteed that every network node, which is presumably part of the same wireless network, can listen to all the network traffic. For example, if nodes A, B, and C are connected to the same wireless network, A may be able to listen to the network data sent by B but not by C. In this case, C is a "hidden node" with respect to A. If C can listen to B but not to A, then A is a hidden node with respect to C.

For proper functionality, it is desirable that a wireless LAN should also be able to connect to a wired LAN.

There are several problems associated with a wireless LAN which complicate the implementation of an internetworking device as a means for connecting a wireless LAN to a wired LAN. A primary function of such a device would be to resend overheard wireless LAN network data that is destined for a wired node onto the wired LAN, and vice versa. Depending on the wireless medium chosen, each such device would normally have a limited range. In order to provide adequate coverage, a plurality of devices, each having some degree of overlapping area is necessary. This would normally result in the duplication of messages received by nodes within the overlapping areas, and also on the wired LAN for messages originating from such nodes.

A system for solving this would involve ensuring that every wireless node is associated with at most one such internetworking device, and only an associated device would provide internetworking services for any given wireless node. In such a system, a mechanism for determining which internetworking device each wireless node should associate at any moment is required.

In this specification, the following terms are used:

By internetworking services, we refer to services which allow systems to communicate which could not otherwise. Typical internetworking services include relaying messages from one wireless node to another, resending messages from a wired LAN to a wireless node and resending messages from a wireless node to a wired LAN.

The internetworking node that provides such internetworking services is called an Access Point or AP. The AP is a physical device, which, in order to perform the full range of internetworking services has a wired network adapter as well as a wireless network adapter.

The physical area that a wireless node must be within to be within range of the AP is called the AP's Basic Service Area (BSA). If a wireless node is located within the BSA of a particular AP, that wireless node will be able to receive transmissions sent by that AP.

Each wireless node also has a limited range within which it can communicate. This range is called the Dynamic Service Area (DSA) of the wireless node in this specification. Other nodes within an wireless node's DSA will normally be able to receive transmissions from the wireless node.

If the wireless nodes use the same adapter as the APs, then, all other things being equal, the wireless nodes will have the same range as the APs. However there can be differences between the BSA range of the AP and the DSA range of a wireless node. For one thing, the wireless nodes are usually movable. Thus their range is likely to change, depending on how their signals are affected by obstacles as they move. Also, access points, being physically connected to a wired LAN, are also connected to a supply of power. Thus, the transmitter used in an AP can be more powerful than the battery powered transmitters of the wireless nodes. If this is the case, the BSA range of an access point would normally be larger than the DSA range of a wireless node.

In this specification, we will distinguish between the BSA of an AP and the DSA of a wireless node, even if the two ranges are the same. In this specification, one wireless node is said to be able to "hear" a second wireless node if it is within the DSA of the second node, so that signals sent by the second node can be received by it. Similarly, a wireless node can "hear" an AP if it is within the BSA of the AP, and an AP can "hear" a wireless node if the AP is within the DSA of that node.

A "multicast" message is a form of broadcast message, sent by a wired node, which is addressed to other nodes having the same specific group address. All other wired network nodes will ignore that message.

SUMMARY OF THE INVENTION

The invention provides a method and means for using one or more APs as internetworking nodes which interconnect a wired LAN and wireless nodes within range of each AP, and for determining when each AP should act to transmit data between the wired LAN and wireless nodes.

The primary functions for each AP are, when appropriate, i) to resend data packets from a wireless node onto the wired LAN if the data packets cannot otherwise reach their destination (eg, if they are destined for a wired node, or are destined for a wireless node outside of the DSA of the sending node); and ii) to resend data packets, which are addressed to a wireless node, from the wired LAN to the wireless node. Preferably, the wireless node is part of a wireless LAN. The AP, having both a wired network adapter as well as a wireless network adapter, can communicate using both the packet delivery system of the wired medium, as well as the packet delivery system of the wireless medium. Furthermore, the AP is able to convert a data packet from one system to the other.

Preferably, the APs will also redirect information between two wireless nodes which are both within the AP's range, but are hidden to each other.

To achieve these functions each AP has to know whether the data packets are for a destination within its own BSA, and whether it is responsible for acting. The wireless nodes use a process of association with at most one of the APs to carry out these functions. Each wireless node within range of at least one AP will associate itself with a single AP, even if it is within range of more than one AP. Once a wireless node associates itself with an AP, it will use that AP, and only that AP, to forward data to and from the wireless node. The AP keeps track of which nodes are associated with it, in order to determine whether it is responsible for acting.

Each wireless node monitors the wireless network traffic, and keeps track of which nodes are within its range, ie, which other wireless nodes it has overheard recently. According to the invention, each wireless node uses this information to determine which wireless nodes, including APs, are within its range.

Each AP broadcasts information about itself at regular intervals in the form of a beacon identifying its network address. Each wireless node can determine, from either the AP's regular data transmissions, or from this beacon, whether it is within the AP's BSA. The invention provides for a tracking mechanism wherein each wireless node keeps track of APs it has overheard. Preferably the node maintains a table of APs it has overheard recently.

The tracking mechanism maintains a table of all APs the wireless node has recently overheard, and deletes all APs which fail to satisfy some predefined tracking criteria. A preferred tracking criterion is based on a period of time since the wireless node last heard a transmission from a particular AP.

In the preferred embodiment, however, the wireless nodes do not require an internal timing mechanism for this purpose, but rather, use the beacons of other APs as an external counting mechanism. When a wireless node has not heard from a particular AP in a period in which the node has heard a specified number of beacons from a reference AP, the wireless node concludes that the particular AP is no longer in range. Each wireless node maintains an AP table of all AP's it has heard, but then deletes from this table, any AP from which it has not heard during a period in which it has heard a specified number of beacons from some other AP.

In the preferred embodiment, the decay of addresses out of each wireless node's AP Table is done using external timer ticks represented by AP beacons. Each AP, within whose BSA the mobile node is located, represents a different timer. In general, a particular AP will be deleted from the table when the wireless node hears any other AP beacon a predetermined number of times before it next hears that particular AP's beacon.

If the wireless node overhears data packets (either normal traffic or a beacon) from an AP, it can attempt to associate with the AP by sending an association request to the AP. If a wireless node's association request fails, it will preferably attempt to associate with another AP currently in its AP table.

If the wireless node overhears more than one AP, or there is more than one AP in its table, the wireless node must select an AP. The invention provides a switching mechanism for determining which AP to choose.

In one embodiment the switching mechanism causes the node to associate with an overheard AP if its AP table was previously empty. Also, the node will maintain its association until a failure of transmission occurs, or the associated AP is decayed out of the node's AP table, according to the tracking mechanism. In either event, the node will check its AP table and attempt to associate with the most recently heard A.

The preferred embodiment of the switching mechanism incorporates the following assumption: if a wireless node has just moved into an AP's BSA, it is then likely to move further into that AP's BSA. At the same time, it is also likely moving out of the AP's BSA that it is currently associated with. It should therefore switch its association to the new AP. These assumptions will be true when the mobile node continues to move, and does not move nearly tangentially to one or other of the AP's BSAs.

Therefore, in the preferred embodiment a mobile wireless network node will attempt to associate with an AP (or switch its association from another AP) when one of the following conditions occurs:

the mobile wireless network node observes a beacon or data traffic originated from an AP that is not already in its AP table; or the mobile wireless network node fails to communicate with the AP it is associated with; or the AP is decayed out of its AP table.

This mechanism allows the mobile wireless network node to switch its association early to a new AP which BSA it is moving into. It also prevents the mobile wireless network node from switching its association back and forth between two APs when it is situated in the overlapping area of the BSAs of the APs. In that situation, the two APs are both in the mobile wireless network node's AP table, and the node will not switch its association based on hearing alternate data traffic or beacon originating from the two APs.

These foregoing aspects of the invention, together with other aspects and advantages thereof will be more apparent from the following description of the preferred embodiments thereof, taken in conjunction with the following drawings.

DETAILED DESCRIPTION OF THE PREFERRED EMBODIMENT

The preferred embodiment is discussed and illustrated with respect to an example of its implementation using Infra-red (IR) wireless LANs and Ethernet wired LANs. It should be appreciated that the invention is not limited to IR wireless LANs or Ethernet wired LANs and could be similarly implemented in other wireless LANs and/or wired LANs.

Figure 1:
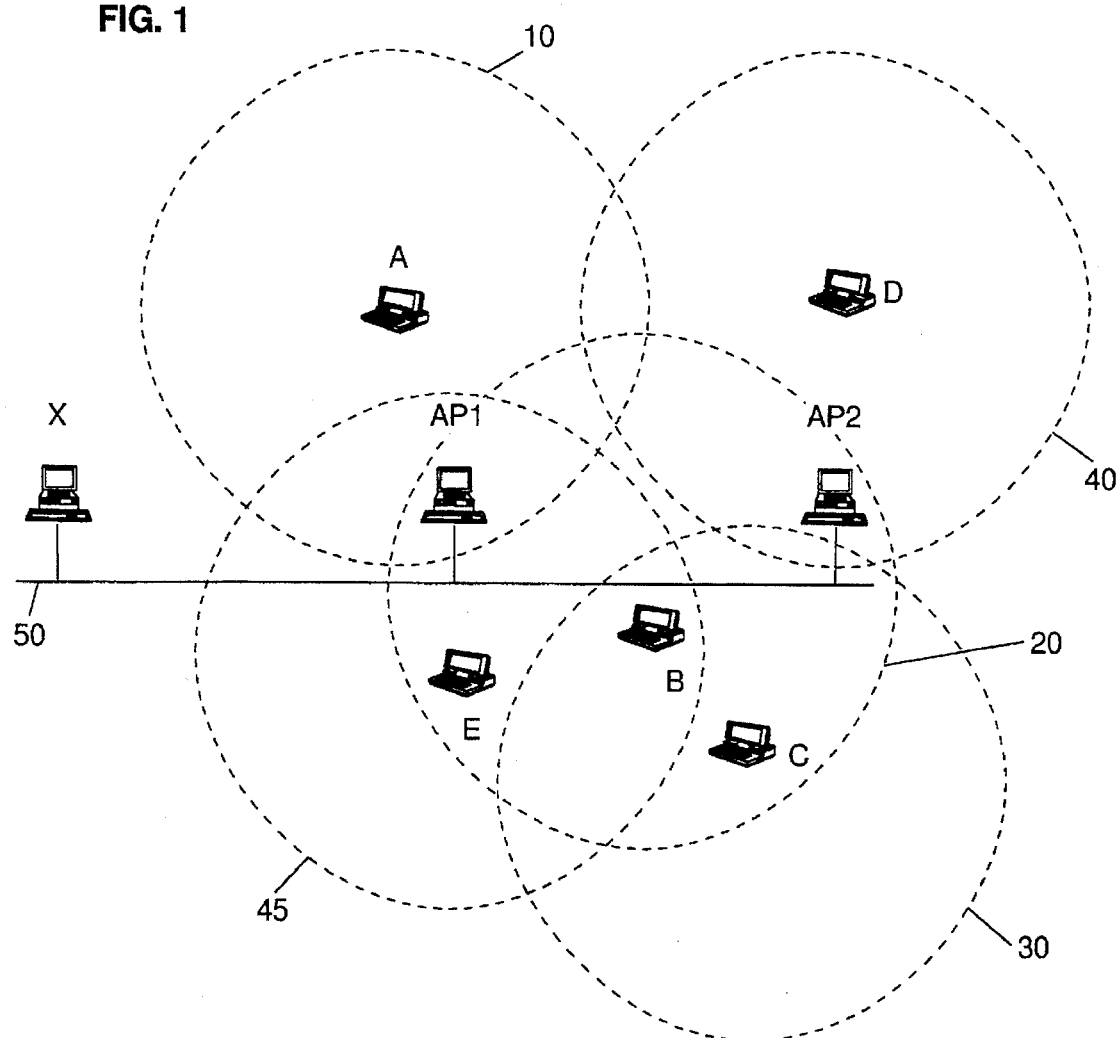
FIG. 1 schematically illustrates a configuration of wireless nodes around a wired LAN, with two APs acting as internetworking nodes, with the DSA of each wireless node shown in phantom.
Figure 2:
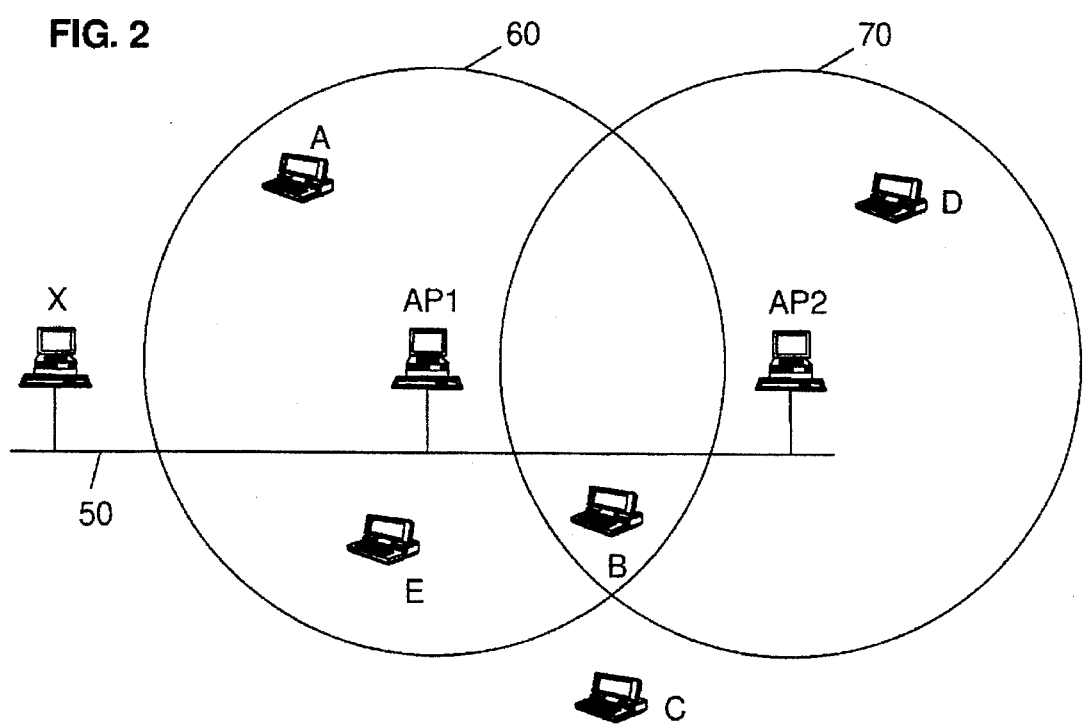
FIG. 2 illustrates schematically the same configuration as is shown in FIG. 1, but with the BSA of each AP shown in phantom.

FIG. 1 and FIG. 2 each illustrate a configuration of wireless nodes A, B, C, D and E, a wired LAN 50, wired node X and APs AP1 and AP2. Each AP is a physical device that has a wired network adapter as well as a wireless network adapter. Each AP understands both the wired LAN and wireless LAN protocols.

In the preferred embodiment, using ISO/CCITT OSI international standard terminology, the AP behaves as a layer 2 Data Link Layer entity that "bridges" between the wireless LAN and the wired LAN. It resends the data traffic from the wireless LAN to the wired LAN in such a way that the data traffic appears to nodes of the wired LAN to have come from wired network nodes in the wired LAN. It also resends the data traffic from the wired LAN to the wireless LAN in such a way that the data traffic appears to the wireless nodes of the wireless LAN to have come from wireless nodes in the wireless LAN. Thus, each AP functions as a transparent MAC-bridge (wherein MAC stands for Medium Access Control, as is known in the art) that connects the IR wireless nodes to the ethernet wired LAN.

In the examples illustrated in drawings, the same wireless adapter is used for both the APs and the wireless nodes. Therefore the BSA range of the APs, ignoring the effect of obstacles, will be the same as the DSA ranges for the wireless nodes. As stated earlier, the AP, being connected physically to a power supply, could support a more powerful transmitter, with an extended BSA range.

FIGS. 1 and 2 are the same except that FIG. 1 illustrates the DSA ranges of the wireless nodes while FIG. 2 illustrates the BSA ranges of the APs. In FIG. 1, wireless node A has a DSA 10, wireless node B has a DSA 20, wireless node C has a DSA 30, wireless node D has a DSA 40, and wireless node E has a DSA 45.

In the IR wireless LAN, it cannot be guaranteed that every network node that is part of the same wireless network can listen to all the network traffic. In FIG. 1, wireless node E can listen to the network data sent by wireless node B but not by wireless node C because wireless node E is within B's DSA 20, but is outside C's DSA 30. In this case, C is a hidden node with respect to E. Similarly C is a hidden node with respect to E, because C is outside E's DSA 45.

In some situations, it is possible for one IR wireless node to receive data sent by another wireless node but not be able to send to that node. For example, a first node (not shown) would be able to listen to the network data sent by a second node (not shown), but the second node would not be able to receive the data sent by the first node. This situation is known as asymmetry.

To compensate for possible wireless transmission failure, wireless packet delivery systems usually require receiving nodes send a specific acknowledgement to the sending node, acknowledging the receipt of each data packet. For example if wireless node A sends a directed packet to wireless node B, B will in turn send a packet to A, acknowledging receipt of A's message. These acknowledgements are not normally required for packet delivery systems on wired LANs, due to the low failure rate of transmissions in such mediums.

Turning now to FIG. 2, the BSA of AP1 is illustrated by circle 60 whereas AP2 is shown as having BSA 70. Wireless nodes A, B and E are within the BSA 60 of AP1. Wireless node B is also within the BSA 70 of AP2, as is wireless node D. Wireless node C is not within range of either access point.

It should be noted that because node B is within range of both APs, the wired LAN will receive unwanted duplicated messages if both AP1 and AP2 resend a message from B to the wired LAN, and likewise, node B will receive unwanted duplicated messages if both AP1 and AP2 resend a message from the wired LAN to B.

To avoid such duplication the invention provides a switching mechanism for ensuring that no more than one AP will act for any particular wireless node, by ensuring that every wireless node is "associated" with no more than one AP.

Each wireless node determines which AP (assuming there is more than one in range) it will associate with. Furthermore, each wireless node determines whether it can transmit a message directly to its destination node, and it asks an AP to deliver the message if it cannot do so directly. Each AP determines whether it should resend a data packet from the wired LAN to the wireless node to which the packet is addressed. Each AP monitors the wired LAN data traffic for any data packets that are destined for (ie, addressed to) one of the AP's associated wireless nodes. If the AP hears such a data packet on the wired LAN, it intercepts the data packet and relays it to the wireless node.

Each wireless node must be aware of what other nodes are around it, so it will be able to decide whether it can send to them. Therefore, each wireless node monitors the wireless traffic, and maintains a table of the addresses of all wireless nodes it has overheard recently. We shall refer to this as the DSA table. If a node has overheard another node, then the other node's address is in its DSA table and it assumes it can transmit to that node (ie, it ignores asymmetry, at least initially). This table represents all of the other nodes within whose DSA the tracking node is. This is assumed (by ignoring asymmetry) to represent all nodes within the DSA of the tracking node.

In the preferred embodiment, each wireless node relies on overheard messages emanating from nearby nodes (including all acknowledgements) to construct its DSA table. Optionally, each wireless node can emit a beacon, which would automatically be overheard by all other nodes within its DSA.

Each wireless node also monitors the network traffic looking for data packets sent by an AP. To assist wireless nodes (especially nodes actually moving) in locating nearby APs, each AP of the preferred embodiment of the present invention will emit a beacon, at regular intervals, eg, every 20 seconds, identifying the APs wireless network address. In the preferred embodiment, each wireless node maintains a separate table, called an AP table, which lists the addresses of all APs it has overheard. Preferably, this table also stores other information, for example which AP has been heard most recently, most frequently, least frequently, etc. Alternatively, this information could be stored as part of the DSA table. Preferably, the wireless node can differentiate between data packets from APs and packets from other wireless nodes because a bit in the control field of a wireless data packet indicates whether the data packet originates from an AP. Alternatively, each AP is assigned a unique wireless network address with a common prefix for its wireless LAN connection. For example, the network address may be "IRAP001" where IRAP is a common prefix for all AP wireless network addresses. No wireless network node other than an AP is assigned that common prefix. Each AP is also assigned a wired group network address for its wired LAN connection. The group address is used for sending "multicast" broadcasts. When a "multicast" message, a form of broadcast message, is sent to the AP group network address in the wired LAN, all APs, but only APs, receive that message. All other wired network nodes ignore that message.

When a wireless node overhears an AP, its tracking system will enter this AP into its AP table and its switching mechanism will determine which of the APs in its AP table it will associate with. Examples of this procedure could be: associate if the table is empty (ie, the wireless node has just powered on, or just entered the vicinity of a wired LAN), or maintain association with the current AP until it can no longer hear that AP, or associate with the AP heard most frequently, etc. The preferred embodiment of this procedure will be discussed below.

If the procedure indicates the wireless node should associate with the AP, the wireless node will send an association request data packet to the AP. If the association request data packet is sent successfully to the AP, ie, acknowledged by the AP, the wireless network node considers itself associated with that AP. The association request includes the wireless network address of the wireless node. Preferably, the request also indicates which AP, if any, the wireless node was previously associated with.

Each AP maintains a table, called its (Basic Service Set) BSS table, of all wireless nodes which it is associated with. After receiving the association request successfully from the wireless node, the AP adds the network node address to its BSS table. The AP can be configured so that if the association request indicates the wireless network node was associated with another AP previously, the AP sends a disassociate data packet to the previous AP via the wired LAN to the previously associated AP telling the AP to disassociate with the wireless node. Alternatively, once a wireless node associates with a new AP, it can instruct this AP to send such a disassociate request to the previous AP.

After receiving the disassociate data packet from the new AP, the previous AP deletes the wireless network node address from its BSS table.

Optionally each AP can also maintain a separate BSA table, similar to the DSA table maintained by each wireless node, listing the node addresses of all wireless nodes within its BSA, regardless of whether they are associated with it.

A wireless node only accepts data packets sent by the AP it is associated with; it will discard all data packets sent by other APs. It will, of course, accept data packets that are destined for it which are sent by other wireless nodes.

As stated, the selection of which AP will be associated with each wireless node is determined by each wireless node. Therefore, each AP accepts all data packets sent by any wireless node. If the AP receives a data packet directed to it by a wireless node that it is not associated with, the AP considers the data packet as an implicit association request. It adds the wireless node address to its BSS table and relay the data packet onto the wired LAN.

If a wireless node fails to send a data packet to its associated AP successfully, ie, the AP fails to acknowledge receipt of the data packet, the wireless node considers its wireless connection with the AP broken. It will delete its association with that AP. It then checks its AP table to see if another AP is available. If there is one, it will attempt to establish an association with that AP. If there is more than one, the AP will preferably select the AP heard most recently.

Similarly, if the AP fails to send a data packet successfully to the wireless node that is associated with it, it considers its wireless connection with the wireless node broken, and deletes the node from its BSS table.

In operation, when a wireless node (the sending node) is ready to send a data packet to another network node (the destination node), it first determines whether the network node address of the destination node is in its DSA table. If it is, this implies that the destination node is another wireless node within the DSA of the sending node. The sending node therefore sends the data packet to the other wireless node directly. If the destination node is not within the DSA table, the sending node sends the data packet to the AP it is associated with and asks the AP to help deliver the data packet to the destination node.

After receiving the data packet, the AP checks the destination of the data packet against its BSS. If the destination node is within its BSS (ie, if the destination node is also associated with the AP), the AP sends the data packet to the destination node directly via the wireless medium. Otherwise, the AP resends the data packet onto the wired LAN. If the destination node is a wired node, it will receive the data packet directly. If the destination node is on another wireless LAN which is attached to the same wired LAN by another AP (ie, the destination node is a wireless node associated with another AP), the other AP will relay the data packet to that destination node.

Figure 3:
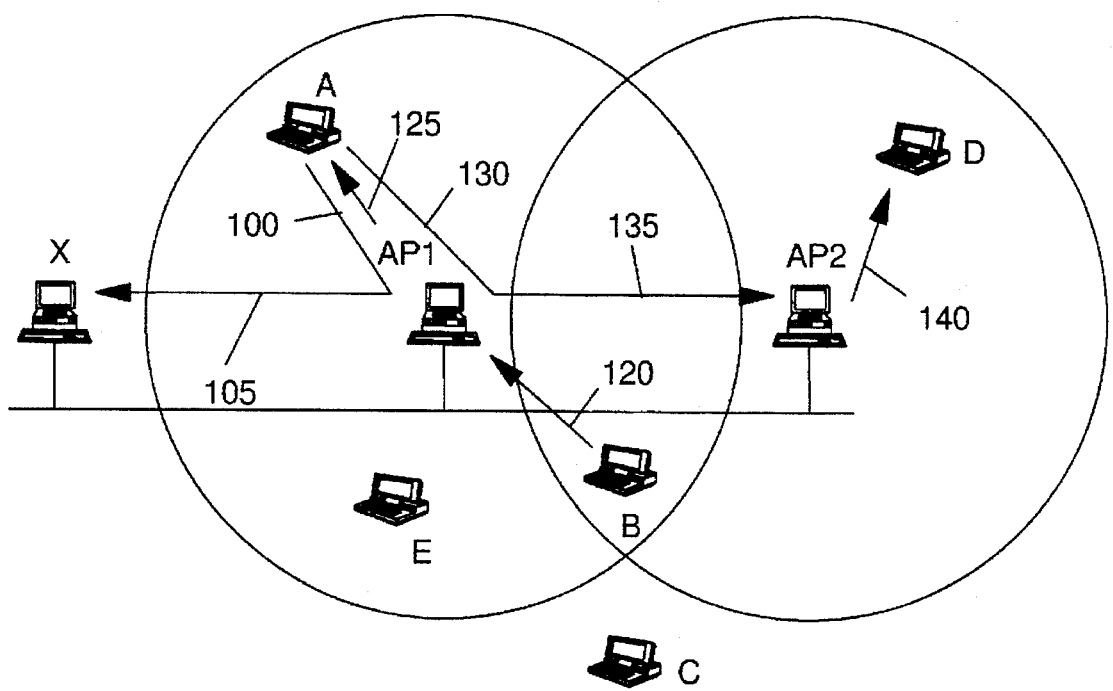
FIG. 3 illustrates schematically, for the same configuration as is shown in FIG. 2, how the preferred embodiment of the present invention is used to relay a message from B to A, from A to D and from A to X.

FIG. 3 shows three examples of how the preferred embodiment works. Assume wireless network node A has just entered the BSA of AP1. We will assume A has not been associated with any AP before. When it hears AP1's beacon, or alteratively, hears some data traffic from AP1 to wireless network node B, node A sends an association request data packet to AP1. After sending the association request data packet successfully (ie, receiving AP1's acknowledgement), A considers itself associated with AP1. After receiving the association request data packet successfully, AP1 adds A to its BSS table. It also sends a disassociation data packet on the wired LAN, advising any previously associated AP that AP1 is now associated with node A and that the previous AP should disassociate. This can be done by way of multicast or by a directed packet to the AP A was actually associated with.

Let us assume A wants to send a data packet to wired network node X. A first consults its DSA table to see if X is a wireless node within range. Since X is not in A's DSA, A sends the data packet to AP1 as is shown by arrow 100 in FIG. 3. AP1 then consults its BSS table to determine whether X is an associated wireless node within its BSA. Since X is not so listed, AP1 in turn resends the data packet onto the wired LAN, as is shown by arrow 105.

Let us further assume that after X receives the data packet, it sends a response data packet back to A. AP1 monitors the wired LAN data traffic and overhears a data packet destined for A, which is in its BSS. AP1 intercepts the data packet and sends it to A via the wireless medium.

Let us now assume both nodes A and B are associated with AP1, i.e., they both are in AP1's BSS, and node B wants to send a data packet to A. Node B examines its DSA to see if A is within range. As can be seen in FIG. 1, node B is not within the DSA 10 of node A,. nor is node A within the DSA 20 of node B. In other words, the nodes are hidden from each other, even though both are within range of AP1. Direct wireless communication between the two nodes is not possible. Therefore, B sends the data packet to AP1 asking it to help deliver the data packet, as is shown by arrow 120 in FIG. 3. AP1 examines its BSS and determines A is associated with it. Therefore, AP1 transmits the data packet by the wireless medium to A, as is shown by arrow 125. It should be noted that even though node B is also within the BSA of AP2, node B is associated with AP1 and therefore does not ask AP2 for assistance.

Now let us assume node A wants to send a data packet to node D, which is associated with AP2. Since node D is not within node A's DSA, A sends the packet to AP1, as is shown by arrow 130. Since node D is not associated with AP1, AP1 resends the data packet onto the wired LAN, as is shown by arrow 135. AP2 overhears this data packet, determines that node D is associated with it, and resends the data packet directly to D, as is shown by arrow 140.

Note that node B is within the BSA of both AP1 and AP2. If node B had been associated with AP2 (and therefore would not have been associated with AP1), and wireless node A sends a data packet to wireless node B, then AP1 would not have transmitted the data packet directly to B, but rather, would have resent it on the wired LAN. In this circumstance, AP2 would intercept the data packet and resend it to B (because B would be in AP2's BSS table), as it would for node D.

Figure 4:
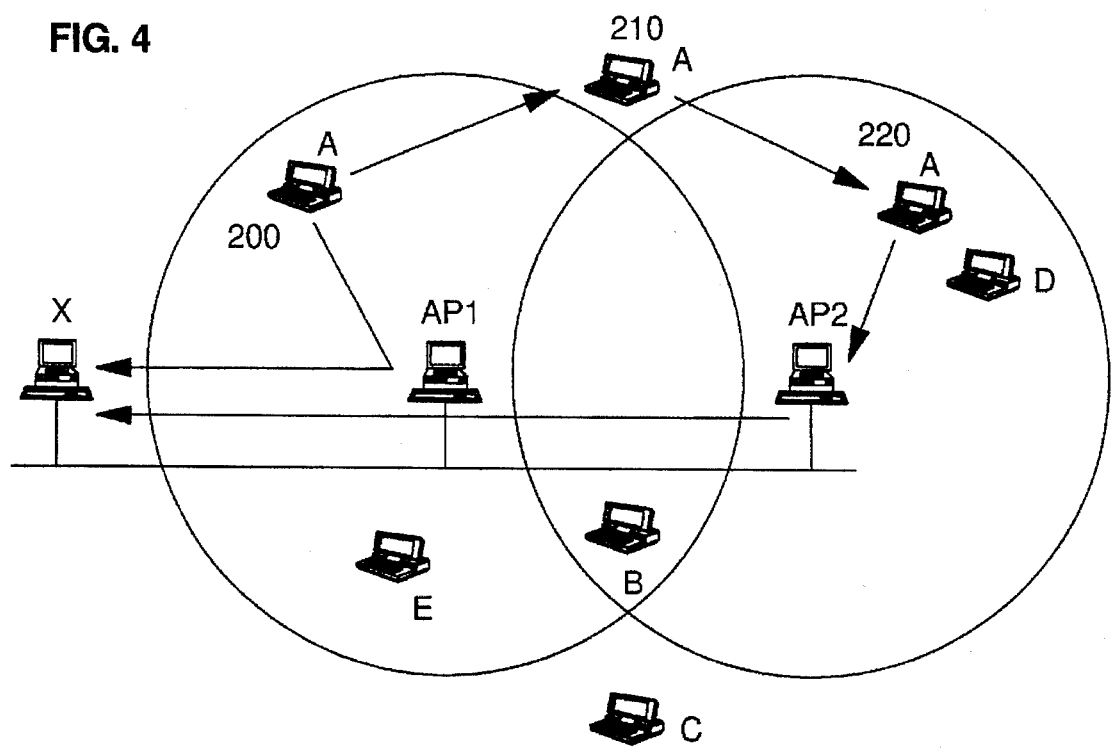
FIG. 4 illustrates schematically, for the same initial configuration as is shown in FIG. 2, node A roaming from the BSA of AP1 to the BSA of AP2.

FIG. 4 illustrates how a roaming wireless node can move in and out of different APs' BSAs. When a wireless node moves between BSAs of APs, it disassociates with one AP and associates with another. The data packets sent by the wireless network node to the wired LAN are resent by different APs depending on where the wireless node is, and which AP the wireless node associates itself with. Likewise, data packets destined for the wireless node are resent by different APs depending on where the wireless node is and which AP the wireless node associates itself with. This procedure will now be described.

When an node roams, it may roam out of range from all APs in its AP table. The wireless node is then disconnected from the wired LAN until it comes within range of another AP and associates itself with that AP. Of course a roaming node cannot associate itself with an AP until it becomes aware of the presence of that AP (ie, overhears either the AP's beacon or a regular transmission). Optionally, to shorten the time between the wireless network node moving into an AP's BSA and detecting the AP's existence, each AP can broadcast its beacon earlier when it first detects a wireless node. To do this, the AP maintains a BSA table, in addition to its BSS table, as described above. Alternatively it combines the two into an expanded BSA table, with an additional column identifying whether each wireless node listed is associated with it. If an AP overhears a wireless node which is not listed in its BSA table, the AP generates its beacon ahead of schedule. The AP detects the existence of the wireless node by overhearing a data packet, usually a broadcast packet, sent by the wireless node. This broadcast packet is usually generated in response to the upper layer network operating system trying to determine which other nodes are present in the network. The result of this broadcast packet emitted by a wireless network node is an early scheduled beacon emitted by the AP, which in turn starts the association process.

Referring to FIG. 4 for example, assume wireless node A is originally located at position 200, and is associated with AP1. It therefore communicates with wired network node X via AP1. As A moves to an area which is not covered by any AP, as is illustrated as position 210, it cannot receive acknowledgements from AP1 for any packets which it sends via AP1 to X. It thus ceases to consider itself associated with AP1 as it cannot communicate with AP1 any more. As A moves into AP2's BSA, as shown at 220, it recognizes the existence of AP2 either by observing AP2's beacon or AP2's data traffic. It is possible AP2 would overhear node A before A overhears AP2. In this case, as AP2 would not have heard A at either position 200, or 210, AP2 can optionally recognize that A is a node previously unheard by it, and emit its beacon early. In any of these events, A initiates an association process with AP2. This reconnects A to the network, allowing A to communicate with X again. Assuming an entire area is sufficiently covered by APs, A can move around the area while remaining connected to the network.

In one implementation of the above described system, once each wireless node associates with an AP, it will stay associated with that AP until it fails to successfully transit a packet to the AP. In other words, the wireless node will wait for a failure before it associates with another AP.

Preferably, however, the wireless node switches its association before such a failure occurs. One way of doing this is for the mobile node to associate with an AP every time it hears that AP's beacon. In other words, the node would constantly switch its association to the AP whose beacon it has heard most recently. Such a switching mechanism is not preferred, because it involves more switching (and therefore processing) than would normally be necessary. This is especially true if the wireless node is stationary over a period of time in an area of overlapping AP BSAs, in which case it will keep switching its association between the APs, even though a maintained association with any of the APs would suffice.

Each wireless node is therefore provided with a switching mechanism to determine when it should switch APs that it is associated with, and a tracking mechanism for determining what other APs are within range (ie, that it could associate with).

Tracking Mechanism

The tracking mechanism maintains a table of all APs the wireless node has recently overheard, and deletes all APs which fail to satisfy some predefined tracking criteria. A preferred tracking criterion is based on a period of time since the wireless node last heard a transmission from a particular AP. One way of tracking using this criterion is to provide the mobile node with an internal timing mechanism, which records the time interval from the last time each AP was heard.

In the preferred embodiment, however, the wireless nodes do not require an internal timing mechanism for this purpose, but rather, use the beacons of other APs as an external counting mechanism. When a wireless node has not heard from a particular AP in a period in which the node has heard a specified number of beacons from a reference AP, the wireless node concludes that the particular AP is no longer in range. Each wireless node maintains an AP table of all AP's it has heard, but then deletes from this table, any AP from which it has not heard during a period in which it has heard a specified number of beacons from some other AP.

In the preferred embodiment, the decay of addresses out of each wireless node's AP Table is done using external timer ticks represented by AP beacons. Each AP, within whose BSA the mobile node is located, represents a different timer. In general, a particular AP will be deleted from the table when the wireless node hears any other AP beacon a predetermined number of times (hereafter referred to as the "decay threshold" and is designated by the variable "k") before it next hears that particular AP's beacon. The value for k should not be too small, otherwise APs will be decayed out of the AP table because one or more beacons were lost (ie, the wireless transmission from the AP was not properly received by the wireless node), rather than because the wireless node is no longer within range of the AP. Therefore k is preferably not less than 2. However k should not be too large, because the larger k is, the longer the node will continue to act as though the AP is still in range, even after it can no longer be heard.

A suitable value for k is, in most cases, about 5. With such a value, if there are n AP entries in the AP table, a particular AP will be deleted from the table when the wireless node hears one of the n−1 other AP's beacon 5 times before it next hears that particular AP's beacon.

Figure 5:
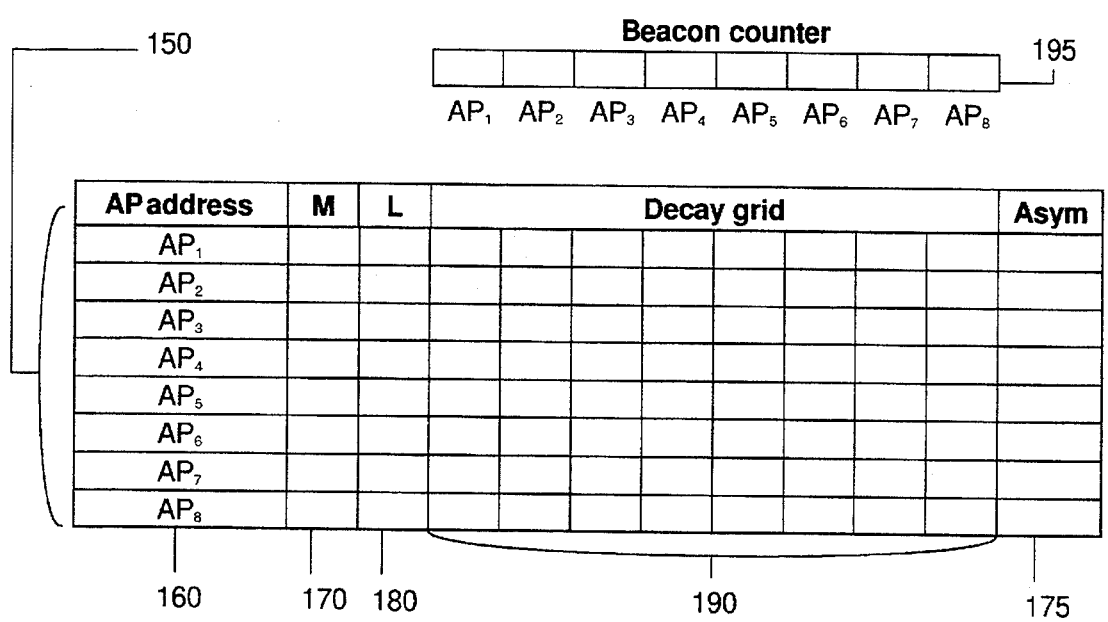
FIG. 5 is an example of the AP table maintained by each wireless node in the preferred embodiment illustrating the decay grid used for deleting APs from the table which are no longer in range.

FIG. 5 illustrates the AP table and beacon counter for a wireless node of the preferred embodiment of the present invention. The AP table comprises a series of rows, indicated generally at 150, wherein each row represents a different AP. This table generally holds a maximum number, N, of AP network addresses. In FIG. 5, N=8.

APx refers the AP listed in the xth row of the decay grid and its address is stored in the xth row of the AP table AP address column. It should be noted that in FIG. 5, the APs are listed in ascending order. This is an arbitrary designation. As the node moves within an area, different rows will be vacated and replaced with the next heard AP. Thus after a particular movement pattern of a node in which, for example, the node moved out of what was AP8's BSA for a sufficient period of time, AP8 could be "decayed" out of the table. The node could then hear another AP, which would be stored in the row formerly represented by AP8. The wireless node could then move back into AP8's BSA. At which point, if no APs had been decayed, the table would be full. The node would replace the least recently heard AP with AP8 even though no AP had been heard sufficiently infrequently to be decayed out using the test of k=5. Thus AP8 could then be in, for example Ap4's row.

It should also be noted that the table does not need to be filled. If only 3 APs can be heard, only 3 rows will be filled with data. Furthermore, these would not necessarily be the first 3 rows of the table, as the AP in one or more of the first rows could have been decayed out and not replaced.

The beacon counter array 195 is an 1×N array of integer numbers, ranging from 0 to k−1. Each element of the array represents the current count (of beacons heard by the node) for each AP in the AP Table. In FIG. 5, the beacon counter array 195 has 8 elements because there are 8 rows in the AP table. Each AP table contains a decay grid in the form of an N×N array of integer numbers, which, for FIG. 5, is an 8×8 array. Each row of the decay grid contains the contents of the beacon counter array immediately prior to when the node last heard the AP for that row.

The "Asym" column 175, stores N (in this case 8) flags—which are boolean variables which store a value of TRUE or FALSE—which indicate whether the node and AP are in an asymmetric relationship. There is thus one flag for each row in the AP table.

The "Asym" flag that is associated with an AP entry is used to handle the asymmetric situation where the wireless network node can hear the AP but the AP cannot hear the wireless network node. The flag is used to decrease the frequency of initiating association requests by the wireless network node in an asymmetric situation. If the wireless network node fails in an attempt to associate with an AP, it will set the Asym flag that is associated with the AP entry. Before the wireless network node sends an association request, it will check the Asym flag. If the flag is set, the wireless network node will not send an associate request. If there are other AP entries in the AP table without the Asym flag set, the wireless network node will attempt to associate with those APs. The Asym flag will be reset when the next AP beacon from that AP is heard.

Column M, generally indicated at 170, keeps track of the order of APs in the AP table from the most recently heard AP to the least recently heard AP. Column L, generally indicated at 180, keeps track of the order of APs in the AP table from the least recently heard AP to the most recently heard AP. Preferably both columns represent linked lists, although other mechanisms could be implemented.

In the preferred embodiment, a doubly-linked list is used to maintain the order in which APs contained in the AP table were last heard with respect to each other (where as the decay grid maintains an implicit count of the number of beacons that have been heard from each AP in the AP table with respect to each other AP in the AP table). The doubly linked list is represented by the columns M and L. The M column is a linked list linked in one direction from the most recently heard AP to the least recently heard AP. That is, each element of the M column corresponds to a row in the AP table, and the value contained in each element is the row number of the next most recently heard AP in the AP table. The least recently heard AP at the instant the table is being inspected cannot contain a valid row because there is no less recent (or next most recent) AP, so that element contains a special value (an end of list marker) indicating it is the last element in the list. A separate variable, called MR, contains a valid row number indicating the most recently heard AP contained in the AP table if there is at least one AP in the AP table, or else contains the "end of list marker" if there is no AP contained in the AP table.

The L column is a linked list linked in one direction from the least recently heard AP to the most recently heard AP. The L column is maintained in the same manner as the M column, with a separate variable, called LR, to indicate which row in the AP table contains the least recently heard AP. Together, the two single linked lists form a doubly linked list. This in turn causes the AP table to be doubly linked list, where each AP address is the data contained in each element of the list, and the column M and L are the links.)

When an AP is heard, it is then the most recently heard AP, so the doubly linked list is updated by "removing" that AP from its position in the list and placing it at the "head" of the list. Obviously, repositioning does not need to be done if the AP is already at the head of the list.

That is, the maximum number of AP entries in the AP table is eight. The decay procedure is implemented by a decay grid of 8×8 and a beacon counter array of 1×8.

For example, each time node A hears a beacon, in this example from APx, A carries out the following steps in updating its AP table:

First, the 1×8 beacon counter array is copied into the xth row of the decay grid. In other words, the contents of the row of the decay grid listing the values for APx is replaced with the contents of the 1×8 beacon counter array as they were just prior to receiving the beacon. This effectively stores, in the xth row, the counter value for each AP that node A has heard since it last heard the beacon for APx. The values of the pointers in columns M and L will also be updated.

Second, the xth element in the 1×8 beacon counter array is then incremented by one, unless this is equal to the value of the decay threshold k−1, in which case the element is reset to zero. In other words, the values of the beacon count cycle between 0 and k−1.

Third, the new value of the beacon counter is then compared with the xth element of each valid row in the decay grid.

Fourth, the first row found, if any, where these values is equal is deleted.

Fifth, and optionally, each row representing an older AP (ie, an AP whose beacon has not been heard since the node last heard the beacon deleted in step four) is also deleted. This can be determined by the pointers of the linked list in column M, which are updated each time the node hears an AP. This results in the deletion of APy from the AP table, if the xth element in the decay grid of APy (ie, the yth row) is equal to the value of the xth element of the updated beacon counter. Furthermore, all other APs not heard since APy was last heard, would also be deleted.

In other words, the counter value of APx at the last time that APy was heard is compared with the current value of the APx counter. If they are equal, that means APy has not been heard for 5 beacon intervals of APx—or in other words—the node has heard APx 5 times since it last heard APy. APy is then considered out of range, and is deleted from the nodes AP table. Optionally, any other AP not heard for as long or longer is also deleted.

This process of checking the AP table for old entries starts with the second most recently heard AP (the AP just heard is the most recent), and continues according to increasing age. Once an AP is found that should be deleted, the system can then delete any older AP merely by checking the value of column M.

If an AP beacon is heard for the first time, i.e., AP does not occupy an entry in AP table, a vacant row in the AP table is located. If all rows are occupied, the least recently heard AP entry will be deleted to make room for the new AP. Assume the new AP is placed in the xth entry, the xth element of the 1×8 beacon counter array is cleared to zero, and also the xth element of each valid row in the decay grid is cleared to zero. The 1×8 beacon array is then copied into the xth row, and the beacon counter for APx is incremented.

If a wireless node overhears a data packet (other than a beacon) sent by an AP, the node can optionally update that AP's row (or insert the AP into the table if it is the first time the node has heard the AP), by copying the beacon counter array into the AP's row of the decay grid. This ensures that the decay grid indicates when the node last heard the AP, in order to avoid having the AP prematurely decayed out of the AP table. However, in this case, the beacon counter itself is not incremented, as no beacon was actually heard.

Switching Mechanism

We will now discuss the switching mechanism. As stated, one possible criterion includes having the node maintain an association with a particular AP, provided it continues to hear that AP during a specified interval. This specified interval can be a pre-specified period of time. However, preferably, the above discussed tracking mechanism is used, so that the interval is not defined in terms of time, but rather, is defined in terms of other AP beacons. In other words, as long as the associated AP has not been decayed out of the node's AP table, and no actual failure has occurred, then the AP will maintain its association with an AP.

The switching mechanism implements the following criteria in determining when a wireless node would attempt to associate with an AP. If the node is unassociated, it will attempt to associate with any AP, as soon as it hears either a data packet or beacon emanating from an AP.

If the node does not receive an acknowledgement from an AP with which it attempts to associate, then the association attempt fails as the wireless node and the AP are likely in an asymmetric relationship. The AP will then check its AP table to see if there is one or more other AP in the table. If there is, it will attempt to associate with the most recently heard AP which is not in an asymmetric relationship with the node. If there is not, then it will remain unassociated until it next hears an AP.

In one embodiment of the switching mechanism, once the node successfully associates with an AP, it will maintain that association as long as the following criteria are met:

i) the node receives an acknowledgement from the AP every time it sends a data packet to the AP.

ii) the currently associated AP is still in the node's AP table.

In other words, the node will maintain its association until a failure of transmission occurs, or the associated AP is decayed out of the node's AP table. In either event, the node will check its AP table and attempt to associate with the most recently heard AP which is not in an asymmetric relationship with the node.

The preferred embodiment of the switching mechanism incorporates the 10 following assumption: if a wireless node has just moved into an AP's BSA, it is then likely to move further into that AP's BSA. At the same time, it is also likely moving out of the AP's BSA that it is currently associated with. It should therefore switch its association to the new AP. These assumptions will be true when the mobile node continues to move, and does not move nearly tangentially to one or other of the AP's BSAs.

Therefore, in the preferred embodiment a mobile wireless network node will attempt to associate with an AP (or switch its association from another AP) when one of the following conditions occurs:

the mobile wireless network node observes a beacon or data traffic originated from an AP that is not already in its AP table; or the mobile wireless network node fails to communicate with the AP it is associated with; or the AP is decayed out of its AP table.

This mechanism allows the mobile wireless network node to switch its association early to a new AP which BSA it is moving into. It also prevents the mobile wireless network node from switching its association back and forth between two APs when it is situated in the overlapping area of the BSAs of the APs. In that situation, the two APs are both in the mobile wireless network node's AP table, and the node will not switch its association based on hearing alternate data traffic or beacon originating from the two APs.

Figure 6:
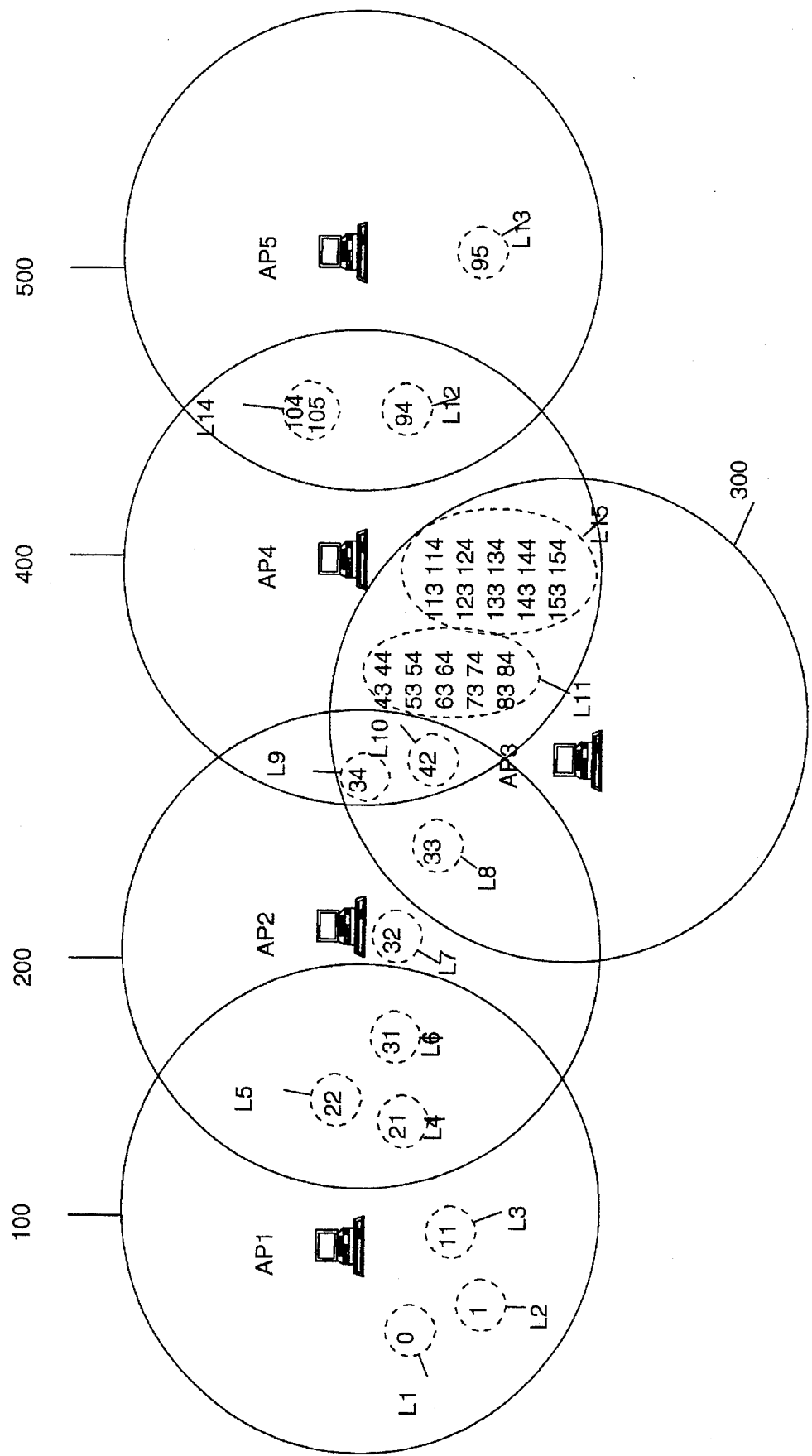
FIG. 6 illustrates schematically a wireless node moving through several locations over time through the BSA's of five APs.

We shall now illustrate both the preferred embodiment of both the tracking and the switching mechanisms with reference to FIG. 6. FIG. 6 is an illustration of a wireless node (M) moving through the BSA's of a particular configuration of Access Points (APs), which are conveniently called AP1, AP2, AP3, AP4 and AP5 in order to illustrate the two mechanisms. It should be noted that the APs would not necessarily be sequentially addressed or ordered in the decay tables. Each AP in this example is connected to a wired LAN (not shown). Each BSA is illustrated by a solid circle. AP1 has BSA 100, AP2 has BSA 200, AP3 has BSA 300, AP4 has BSA 400, and AP5 has BSA 500.

The tracking mechanism will be illustrated by showing how a node of the preferred embodiment of the present invention will update its AP table as it moves within this configuration. The switching mechanism will be illustrated by showing when and where the node will switch its association from one AP to another.

For ease of illustration, FIG. 6 illustrates an artificial example, in which each AP transmits its beacon at a discrete time, and in sequence, all starting at some time after a common time zero. Each AP emits its beacon every 10 seconds, with AP1 starting at second 1, AP2 starting at second 2, AP3 starting at second 3, etc. Each beacon therefore represents a unique time signature in this example. For example, at time signature 43 (ie, 43 seconds after time 0), AP3 emits its fourth beacon, and at time signature 84, AP4 emits its eighth beacon.

The wireless node itself is not shown. Rather, several discrete locations of the wireless node are illustrated by phantom location circles, each labelled with the letter L. Thus, L1 represents the first location, L2 represents the second location, etc. The numbers located within each location circle are time signatures, representing the time (and therefore a unique beacon) in seconds, after time zero. Each location includes at least one time signature. Thus each location identifies a position of the wireless node, and the time signature numbers within each location circle identifies the AP beacons heard by the wireless node while at that particular location, and also at what time. For example, the wireless node starts at location L1 at time zero. At time 32 (ie, 32 seconds later), the wireless node is located at L7, which is within BSA 200, and hears AP2's third beacon. At time 32, the node is within range of AP2, but is not within range of any other AP.

In this example the wireless node's AP table is illustrated to have 6 rows, i.e., N equals 6. Therefore the Beacon counter array will have a maximum of 6 elements, one for each AP in the table, and the decay grid will be a 6×6 array. Asymmetry is ignored in this example (ie, all Asymmetry flags contain the value FALSE throughout and are not shown). The method of maintaining the history of the table (ie, doubly-linked list within columns M and L) is not shown. Also, in this example, the Decay Threshold, k, is 5.

In this example, the wireless node powers up at time zero. Therefore, at time zero, the AP table is empty (does not contain any network addresses), each element of the Decay Grid contains the value 0, as does each Beacon Counter (ie, each element of the beacon counter array).

We will now illustrate the AP table for the node for each time signature shown in FIG. 6.

| | Location L1: Time 0 | | |
|---|---|---|---|
| AP table | | | |
| row | address | Decay Grid | Beacon Counter |
| 1 | — | 0,0,0,0,0,0 | 0,0,0,0,0,0 |
| 2 | — | 0,0,0,0,0,0 | |
| 3 | — | 0,0,0,0,0,0 | |
| 4 | — | 0,0,0,0,0,0 | |
| 5 | — | 0,0,0,0,0,0 | |
| 6 | — | 0,0,0,0,0,0 | |

At time zero, the node is located at L1 and is presumed to power on; therefore its table is empty, it has not heard an AP, and is not associated with any AP.

| | Location L2: Time 1 - just after hearing a beacon from AP1 | | |
|---|---|---|---|
| AP table | | | |
| row | address | Decay Grid | Beacon Counter |
| 1 | AP1 | 0,0,0,0,0,0 | 1,0,0,0,0,0 |
| 2 | — | 0,0,0,0,0,0 | |
| 3 | — | 0,0,0,0,0,0 | |
| 4 | — | 0,0,0,0,0,0 | |
| 5 | — | 0,0,0,0,0,0 | |
| 6 | — | 0,0,0,0,0,0 | |

In this example, the node moved to L2, which is its location at time 1, when it hears AP1's first beacon. AP1 is therefore added to its table (in the first row), and the first element of the beacon counter is incremented by 1.

As the AP has just heard an AP, it makes an association request with AP1. In this example we will assume all such requests are successful.

| | Location L3: Time 11 - just after hearing a beacon from AP1 | | |
|---|---|---|---|
| AP table | | | |
| row | address | Decay Grid | Beacon Counter |
| 1 | AP1 | 1,0,0,0,0,0 | 2,0,0,0,0,0 |
| 2 | — | 0,0,0,0,0,0 | |
| 3 | — | 0,0,0,0,0,0 | |
| 4 | — | 0,0,0,0,0,0 | |
| 5 | — | 0,0,0,0,0,0 | |
| 6 | — | 0,0,0,0,0,0 | |

By time 11, the node has moved to L3. It then hears AP1's second beacon. According to the tracking mechanism, the Beacon counter is inserted into AP1's row of the decay grid, and then the first element of the Beacon Counter (ie, the element tracking AP1) is incremented. In other words, the Beacon counter array, as it existed the last time any beacon was heard, ie, time 1, is inserted into row 1 of the decay grid.

The node maintains its association with AP1.

Location L4:
Time 21 - just after hearing a beacon from AP1

AP table

| row | address | Decay Grid | Beacon Counter |
|---|---|---|---|
| 1 | AP1 | 2,0,0,0,0,0 | 3,0,0,0,0,0 |
| 2 | — | 0,0,0,0,0,0 | |
| 3 | — | 0,0,0,0,0,0 | |
| 4 | — | 0,0,0,0,0,0 | |
| 5 | — | 0,0,0,0,0,0 | |
| 6 | — | 0,0,0,0,0,0 | |

The node has now moved to L4, which is within the overlapping BSA's of AP1, and AP2. However, at time 21, the node has just heard AP1's third beacon, and will not hear Ap2's beacon until time 22. Therefore the decay grid and beacon counter are updated as shown, and the node maintains its association with AP1.

Location L5
Time 22 - just after hearing a beacon from AP2

AP table

| row | address | Decay Grid | Beacon Counter |
|---|---|---|---|
| 1 | AP1 | 2,0,0,0,0,0 | 3,1,0,0,0,0 |
| 2 | AP2 | 3,0,0,0,0,0 | |
| 3 | — | 0,0,0,0,0,0 | |
| 4 | — | 0,0,0,0,0,0 | |
| 5 | — | 0,0,0,0,0,0 | |
| 6 | — | 0,0,0,0,0,0 | |

The node has now moved to Location L5 by at time signature 22. At this location, it is now within BSA 200 and is therefore within range of AP2. At time 22, the node hears AP2's third beacon (counting from time zero). The node's tracking mechanism will therefore enter AP2 into the next unoccupied row of the node's AP table (ie, the second row). The Beacon counter array, as it was just prior to time 22 (ie, at time 21) is then inserted into the second (ie, AP2's) row of the decay grid. Thus AP2's row in the decay grid stores the beacon counts of all other APs in the table, at the time the node just hears AP2's last beacon. In this case, the node has already heard AP1's beacon three times ( at time 1, time 11, and time 21), and has not heard any other AP.

The Beacon counter array is then updated to indicate that the node has just heard AP2. In other words, the second element of the beacon counter array is incremented by 1.

The preferred embodiment of the switching mechanism now causes the node to now associate with AP2, because it has just heard AP2, and it was not already in the node's AP table.

Location L6
Time 31 - just after hearing a beacon from AP1

AP table

| row | address | Decay Grid | Beacon Counter |
|---|---|---|---|
| 1 | AP1 | 3,1,0,0,0,0 | 4,1,0,0,0,0 |
| 2 | AP2 | 3,0,0,0,0,0 | |
| 3 | — | 0,0,0,0,0,0 | |
| 4 | — | 0,0,0,0,0,0 | |

-continued

Location L6
Time 31 - just after hearing a beacon from AP1

AP table

| row | address | Decay Grid | Beacon Counter |
|---|---|---|---|
| 5 | — | 0,0,0,0,0,0 | |
| 6 | — | 0,0,0,0,0,0 | |

Decay grid and beacon counter are updated. Association with AP2 is maintained.

Location L7:
Time 32 - just after hearing a beacon from AP2

AP table

| row | address | Decay Grid | Beacon Counter |
|---|---|---|---|
| 1 | AP1 | 3,1,0,0,0,0 | 4,2,0,0,0,0 |
| 2 | AP2 | 4,1,0,0,0,0 | |
| 3 | — | 0,0,0,0,0,0 | |
| 4 | — | 0,0,0,0,0,0 | |
| 5 | — | 0,0,0,0,0,0 | |
| 6 | — | 0,0,0,0,0,0 | |

Decay grid and beacon counter are updated. Association with AP2 is maintained. The node is now no longer in range of AP1, as L7 is wholly outside of AP1's BSA.

Location L8:
Time 33 - just after hearing a beacon from AP3

AP table

| row | address | Decay Grid | Beacon Counter |
|---|---|---|---|
| 1 | AP1 | 3,1,0,0,0,0 | 4,2,1,0,0,0 |
| 2 | AP2 | 4,1,0,0,0,0 | |
| 3 | AP3 | 4,2,0,0,0,0 | |
| 4 | — | 0,0,0,0,0,0 | |
| 5 | — | 0,0,0,0,0,0 | |
| 6 | — | 0,0,0,0,0,0 | |

At this point, the node has just moved into the BSA 300 of AP3, and hears AP3 for the first time (even though it is AP3's fourth beacon since time 0). At this point the beacon counter array is inserted into AP3's row, recording the number of beacons the node had heard from all other APs (in this case 4 from AP1 and 2 from AP2) at the time the node last heard the beacon for AP3. The third element of the beacon counter (representing AP3) is then incremented, in this case indicating the node has heard AP3's beacon once.

According to the preferred switching mechanism, the node now switches its association from AP2 to AP3.

Location L9
Time 34 - just after hearing a beacon from AP4

AP table

| row | address | Decay Grid | Beacon Counter |
|---|---|---|---|
| 1 | AP1 | 3,1,0,0,0,0 | 4,2,1,1,0,0 |
| 2 | AP2 | 4,1,0,0,0,0 | |
| 3 | AP3 | 4,2,0,0,0,0 | |
| 4 | AP4 | 4,2,1,0,0,0 | |

Location L9
Time 34 - just after hearing a beacon from AP4

AP table

| row | address | Decay Grid | Beacon Counter |
|---|---|---|---|
| 5 | — | 0,0,0,0,0,0 | |
| 6 | — | 0,0,0,0,0,0 | |

The node has moved to Location 9 by time 34, which is just in time to hear AP4's beacon.

Since AP4 was not previously within its AP table, the node switches its association from AP3 (which it had only just associated with) to the newly heard AP4.

After the tracking mechanism has updated both the AP table and the beacon counter array, it can be seen that the node has heard AP4 once (from the fourth element of the beacon counter array), and just before the node heard AP4, as indicated by the fourth row of the decay grid, the node had heard AP1 4 times, AP2 twice, and AP3 once.

Location L10
Time 42 - just after hearing a beacon from AP2

AP table

| row | address | Decay Grid | Beacon Counter |
|---|---|---|---|
| 1 | AP1 | 3,1,0,0,0,0 | 4,3,1,1,0,0 |
| 2 | AP2 | 4,2,1,1,0,0 | |
| 3 | AP3 | 4,2,0,0,0,0 | |
| 4 | AP4 | 4,2,1,0,0,0 | |
| 5 | — | 0,0,0,0,0,0 | |
| 6 | — | 0,0,0,0,0,0 | |

The node maintains its association with AP4.

Location L11
The node arrives at this location by time 43 and remains in this location through at least time 84:
Time 43 - just after hearing a beacon from AP3

AP table

| row | address | Decay Grid | Beacon Counter |
|---|---|---|---|
| 1 | AP1 | 3,1,0,0,0,0 | 4,3,2,1,0,0 |
| 2 | AP2 | 4,2,1,1,0,0 | |
| 3 | AP3 | 4,3,1,1,0,0 | |
| 4 | AP4 | 4,2,1,0,0,0 | |
| 5 | — | 0,0,0,0,0,0 | |
| 6 | — | 0,0,0,0,0,0 | |

Time 44 - just after hearing a beacon from AP4

AP table

| row | address | Decay Grid | Beacon Counter |
|---|---|---|---|
| 1 | AP1 | 3,1,0,0,0,0 | 4,3,2,2,0,0 |
| 2 | AP2 | 4,2,1,1,0,0 | |
| 3 | AP3 | 4,3,1,1,0,0 | |
| 4 | AP4 | 4,3,2,1,0,0 | |
| 5 | — | 0,0,0,0,0,0 | |
| 6 | — | 0,0,0,0,0,0 | |

Time 53 - just after hearing a beacon from AP3

AP table

| row | address | Decay Grid | Beacon Counter |
|---|---|---|---|
| 1 | AP1 | 3,1,0,0,0,0 | 4,3,3,2,0,0 |
| 2 | AP2 | 4,2,1,1,0,0 | |
| 3 | AP3 | 4,3,2,2,0,0 | |
| 4 | AP4 | 4,3,2,1,0,0 | |
| 5 | — | 0,0,0,0,0,0 | |
| 6 | — | 0,0,0,0,0,0 | |

Time 54 - just after hearing a beacon from AP4

AP table

| row | address | Decay Grid | Beacon Counter |
|---|---|---|---|
| 1 | AP1 | 3,1,0,0,0,0 | 4,3,3,3,0,0 |
| 2 | AP2 | 4,2,1,1,0,0 | |
| 3 | AP3 | 4,3,2,2,0,0 | |
| 4 | AP4 | 4,3,3,2,0,0 | |
| 5 | — | 0,0,0,0,0,0 | |
| 6 | — | 0,0,0,0,0,0 | |

Time 63 - just after hearing a beacon from AP3

AP table

| row | address | Decay Grid | Beacon Counter |
|---|---|---|---|
| 1 | AP1 | 3,1,0,0,0,0 | 4,3,4,3,0,0 |
| 2 | AP2 | 4,2,1,1,0,0 | |
| 3 | AP3 | 4,3,3,3,0,0 | |
| 4 | AP4 | 4,3,3,2,0,0 | |
| 5 | — | 0,0,0,0,0,0 | |
| 6 | — | 0,0,0,0,0,0 | |

Time 64 - just after hearing a beacon from AP4

AP table

| row | address | Decay Grid | Beacon Counter |
|---|---|---|---|
| 1 | AP1 | 3,1,0,0,0,0 | 4,3,4,4,0,0 |
| 2 | AP2 | 4,2,1,1,0,0 | |
| 3 | AP3 | 4,3,3,3,0,0 | |
| 4 | AP4 | 4,3,4,3,0,0 | |
| 5 | — | 0,0,0,0,0,0 | |
| 6 | — | 0,0,0,0,0,0 | |

Time 73 - just after hearing a beacon from AP3

AP table

| row | address | Decay Grid | Beacon Counter |
|---|---|---|---|
| 1 | — | 3,1,0,0,0,0 | 4,3,0,4,0,0 |
| 2 | AP2 | 4,2,1,1,0,0 | |
| 3 | AP3 | 4,3,4,4,0,0 | |
| 4 | AP4 | 4,3,4,3,0,0 | |
| 5 | — | 0,0,0,0,0,0 | |
| 6 | — | 0,0,0,0,0,0 | |

At this time, the node has just heard AP3's beacon for the 5th time. As stated, k=5 in this example. Therefore, the third element of the beacon counter array (representing AP3), is not incremented to 5, but is rather reset to zero. The next step followed by the tracking mechanism is to compare the 3rd element of the current beacon counter array, with the 3rd element in the decay grid for each AP in the table. If they are equal, this implies that the node has heard AP3 five times since it last heard from the AP being compared. That AP will be decayed out of the table. In this case, the third element in AP1's decay grid, representing the number of times the node had previously heard AP3 when the node last heard AP1, is zero. AP1 is therefore decayed out of the table, as shown.

Meanwhile, the node continues to maintain its association with AP4. As a further illustration (not shown) if the node was now to move back to location L1, ie back within range of AP1, then at time 81 (not shown) AP1 would next emit its beacon. Since AP1 is no longer in the node's AP table, this is the first time the node would have heard AP1's beacon recently. The switching mechanism would then cause the node to associate with AP1

| AP table row address | Decay Grid | Beacon Counter |
|---|---|---|
| (Still at Location L11): Time 74 - just after hearing a beacon from AP4 | | |
| 1 — | 3, 1, 0, 0, 0, 0 | 4, 3, 0, 0, 0, 0 |
| 2 AP2 | 4, 2, 1, 1, 0, 0 | |
| 3 AP3 | 4, 3, 4, 4, 0, 0 | |
| 4 AP4 | 4, 3, 0, 4, 0, 0 | |
| 5 — | 0, 0, 0, 0, 0, 0 | |
| 6 — | 0, 0, 0, 0, 0, 0 | |
| Time 83 - just after hearing a beacon from AP3 | | |
| 1 — | 3, 1, 0, 0, 0, 0 | 4, 3, 1, 0, 0, 0   AP2 is decayed out of the table |
| 2 — | 4, 2, 1, 1, 0, 0 | |
| 3 AP3 | 4, 3, 0, 0, 0, 0 | |
| 4 AP4 | 4, 3, 0, 4, 0, 0 | |
| 5 — | 0, 0, 0, 0, 0, 0 | |
| 6 — | 0, 0, 0, 0, 0, 0 | |

At this time, the node has just heard AP3's beacon. Therefore, the 3rd row in the decay grid is replaced by the beacon counter array as it existed immediately prior to this time. In this example, the contents AP3's row in the decay grid are replaced by the contents of the beacon counter array as of time 74.

The next step is to increment the third element of the beacon counter array, as shown, from zero to one.

The next step followed by the tracking mechanism is to compare the 3rd element of the current beacon counter array, with the 3rd element in the decay grid for each AP in the table. If they are equal, this implies that the node has heard AP3 five times since it last heard from the AP being compared. That AP will be decayed out of the table. In this case, the third element in AP2's decay grid, representing the number of times the node had previously heard AP3 since the node last heard AP2, is one. AP2 is therefore decayed out of the table, as shown.

The node maintains its association with AP4.

| AP table row address | Decay Grid | Beacon Counter |
|---|---|---|
| Time 84 - just after hearing a beacon from AP4 | | |
| 1 — | 3, 1, 0, 0, 0, 0 | 4, 3, 1, 1, 0, 0 |
| 2 — | 4, 2, 1, 1, 0, 0 | |
| 3 AP3 | 4, 3, 0, 0, 0, 0 | |
| 4 AP4 | 4, 3, 1, 0, 0, 0 | |
| 5 — | 0, 0, 0, 0, 0, 0 | |
| 6 — | 0, 0, 0, 0, 0, 0 | |
| Location L12: Time 94 - just after hearing a beacon from AP4 | | |
| 1 — | 3, 1, 0, 0, 0, 0 | 4, 3, 1, 2, 0, 0 |
| 2 — | 4, 2, 1, 1, 0, 0 | |
| 3 AP3 | 4, 3, 0, 0, 0, 0 | |
| 4 AP4 | 4, 3, 1, 1, 0, 0 | |
| 5 — | 0, 0, 0, 0, 0, 0 | |
| 6 — | 0, 0, 0, 0, 0, 0 | |

The wireless node has now moved from location L11 to L12. Only AP3 and AP4 remain in the nodes AP table. The node hears AP4's beacon at time 94, and the node's tracking mechanism upgrades its AP table accordingly.

It can be seen from FIG. 6 that L12 is within the BSA of AP5. However, at time signature 94, the node has just heard AP4's beacon, and has not yet heard a beacon from AP5.

| AP table row address | Decay Grid | Beacon Counter |
|---|---|---|
| Location L13: Time 95 - just after hearing a beacon from AP5 | | |
| 1 — | 3, 1, 0, 0, 0 | 4, 3, 1, 2, 1, 0 |
| 2 — | 4, 2, 1, 1, 0, 0 | |
| 3 AP3 | 4, 3, 0, 0, 0, 0 | |
| 4 AP4 | 4, 3, 1, 1, 0, 0 | |
| 5 AP5 | 4, 3, 1, 2, 0, 0 | |
| 6 — | 0, 0, 0, 0, 0, 0 | |

The node has now moved completely out of AP4's BSA. Furthermore, the node now hears AP5's beacon (in this case, for the first time), and AP5 was not previously in the AP table. The switching mechanism will cause the node to switch its association to AP5.

| AP table row address | Decay Grid | Beacon Counter |
|---|---|---|
| Location L14: Time 104 - just after hearing a beacon from AP4 | | |
| 1 — | 3, 1, 0, 0, 0, 0 | 4, 3, 1, 3, 1, 0 |
| 2 — | 4, 2, 1, 1, 0, 0 | |
| 3 AP3 | 4, 3, 0, 0, 0, 0 | |
| 4 AP4 | 4, 3, 1, 2, 1, 0 | |
| 5 AP5 | 4, 3, 1, 2, 0, 0 | |
| 6 — | 0, 0, 0, 0, 0, 0 | |

The node has now moved back into the overlapping BSA's of AP4 and AP5, in time for the node to hear a beacon from AP4.

The switching mechanism will not switch association, even though the node is now moving towards AP4, because AP4 is still in its AP table. The node maintains its association with AP5.

| AP table row address | Decay Grid | Beacon Counter |
|---|---|---|
| Time 105 - just after hearing a beacon from AP5 | | |
| 1 — | 3, 1, 0, 0, 0, 0 | 4, 3, 1, 3, 2, 0 |
| 2 — | 4, 2, 1, 1, 0, 0 | |
| 3 AP3 | 4, 3, 0, 0, 0, 0 | |
| 4 AP4 | 4, 3, 1, 2, 1, 0 | |
| 5 AP5 | 4, 3, 1, 3, 1, 0 | |
| 6 — | 0, 0, 0, 0, 0, 0 | |
| Location L15: Time 113 - just after hearing a beacon from AP3 | | |
| 1 — | 3, 1, 0, 0, 0, 0 | 4, 3, 2, 3, 2, 0 |
| 2 — | 4, 2, 1, 1, 0, 0 | |
| 3 AP3 | 4, 3, 1, 3, 2, 0 | |
| 4 AP4 | 4, 3, 1, 2, 1, 0 | |
| 5 AP5 | 4, 3, 1, 3, 1, 0 | |
| 6 — | 0, 0, 0, 0, 0, 0 | |

The node has now moved entirely out of AP5's BSA, and is now in the area of the overlapping BSA's of AP3 and AP4. At time signature 113, the node hears AP3's beacon. Furthermore, it has not heard AP3 since time signature 83. However, AP3 has not been decayed out of the node's table. The node will therefore not switch its association from AP5 until AP5 is decayed out of its table, which will happen at time signature 153.

In this example, we assume the wireless node does not attempt to send any message to AP5 in the intervening period. If it does so attempt, it will not receive an acknowledgement from AP5, because it is no longer in range. It will then delete AP5 from its table and attempt to associate with another AP in its table. In this case both AP3 and AP4 are still in its table. It will choose the AP which it has heard most recently, which in this case is AP3.

| AP table row address | Decay Grid | Beacon Counter |
|---|---|---|
| Time 114 - just after hearing a beacon from AP4 | | |
| 1 | — | 3, 1, 0, 0, 0, 0 | 4, 3, 2, 4, 2, 0 |
| 2 | — | 4, 2, 1, 1, 0, 0 |
| 3 | AP3 | 4, 3, 1, 3, 2, 0 |
| 4 | AP4 | 4, 3, 2, 3, 2, 0 |
| 5 | AP5 | 4, 3, 1, 3, 1, 0 |
| 6 | — | 0, 0, 0, 0, 0, 0 |

The node maintains its association with AP5, assuming no attempt is made to communicate with AP5. If the node makes such an attempt, it will fail, at which point it will switch its association. However, since it has just heard AP4's beacon, it will now associate with AP4, because that is the AP it has heard most recently.

| AP table row address | Decay Grid | Beacon Counter |
|---|---|---|
| Time 123 - just after hearing a beacon from AP3 | | |
| 1 | — | 3, 1, 0, 0, 0, 0 | 4, 3, 3, 4, 2, 0 |
| 2 | — | 4, 2, 1, 1, 0, 0 |
| 3 | AP3 | 4, 3, 2, 4, 2, 0 |
| 4 | AP4 | 4, 3, 2, 3, 2, 0 |
| 5 | AP5 | 4, 3, 1, 3, 1, 0 |
| 6 | — | 0, 0, 0, 0, 0, 0 |
| Time 124 - just after hearing a beacon from AP4 | | |
| 1 | — | 3, 1, 0, 0, 0, 0 | 4, 3, 3, 0, 2, 0 |
| 2 | — | 4, 2, 1, 1, 0, 0 |
| 3 | AP3 | 4, 3, 2, 4, 2, 0 |
| 4 | AP4 | 4, 3, 3, 4, 2, 0 |
| 5 | AP5 | 4, 3, 1, 3, 1, 0 |
| 6 | — | 0, 0, 0, 0, 0, 0 |
| Time 133 - just after hearing a beacon from AP3 | | |
| 1 | — | 3, 1, 0, 0, 0, 0 | 4, 3, 4, 0, 2, 0 |
| 2 | — | 4, 2, 1, 1, 0, 0 |
| 3 | AP3 | 4, 3, 3, 0, 2, 0 |
| 4 | AP4 | 4, 3, 3, 4, 2, 0 |
| 5 | AP5 | 4, 3, 1, 3, 1, 0 |
| 6 | — | 0, 0, 0, 0, 0, 0 |
| Time 134 - just after hearing a beacon from AP4 | | |
| 1 | — | 3, 1, 0, 0, 0, 0 | 4, 3, 4, 1, 2, 0 |
| 2 | — | 4, 2, 1, 1, 0, 0 |
| 3 | AP3 | 4, 3, 3, 0, 2, 0 |
| 4 | AP4 | 4, 3, 4, 0, 2, 0 |
| 5 | AP5 | 4, 3, 1, 3, 1, 0 |
| 6 | — | 0, 0, 0, 0, 0, 0 |
| Time 143 - just after hearing a beacon from AP3 | | |
| 1 | — | 3, 1, 0, 0, 0, 0 | 4, 3, 0, 1, 2, 0 |
| 2 | — | 4, 2, 1, 1, 0, 0 |
| 3 | AP3 | 4, 3, 4, 1, 2, 0 |
| 4 | AP4 | 4, 3, 4, 0, 2, 0 |
| 5 | AP5 | 4, 3, 1, 3, 1, 0 |
| 6 | — | 0, 0, 0, 0, 0, 0 |
| Time 144 - just after hearing a beacon from AP4 | | |
| 1 | — | 3, 1, 0, 0, 0, 0 | 4, 3, 0, 2, 2, 0 |
| 2 | — | 4, 2, 1, 1, 0, 0 |
| 3 | AP3 | 4, 3, 4, 1, 2, 0 |
| 4 | AP4 | 4, 3, 0, 1, 2, 0 |
| 5 | AP5 | 4, 3, 1, 3, 1, 0 |

| AP table row address | Decay Grid | Beacon Counter |
|---|---|---|
| -continued | | |
| 6 | — | 0, 0, 0, 0, 0, 0 |
| Time 153 - just after hearing a beacon from AP3 | | |
| 1 | — | 3, 1, 0, 0, 0, 0 | 4, 3, 1, 2, 2, 0 |
| 2 | — | 4, 2, 1, 1, 0, 0 |
| 3 | AP3 | 4, 3, 0, 2, 2, 0 |
| 4 | AP4 | 4, 3, 0, 1, 2, 0 |
| 5 | — | 4, 3, 1, 3, 1, 0 |
| 6 | — | 0, 0, 0, 0, 0, 0 |

At this point, AP5 is decayed out of the node's AP table, because it has now heard AP3 five times since it last heard AP5.

The tracking mechanism determines this by comparing the 3rd element of the Beacon counter array, which is now "1", because it has just heard AP3, with the third element of the decay grid of every AP which is still in the table. In this case AP5's third element is also equal to 1, so AP5 is decayed out.

Until this point, the node has maintained its association with AP5. The switching mechanism will now switch the node's association to AP3, because it is the most recently heard AP remaining in the AP table.

| AP table row address | Decay Grid | Beacon Counter |
|---|---|---|
| Time 154 - just after hearing a beacon from AP4 | | |
| 1 | — | 3, 1, 0, 0, 0, 0 | 4, 3, 1, 3, 2, 0 |
| 2 | — | 4, 2, 1, 1, 0, 0 |
| 3 | AP3 | 4, 3, 0, 2, 2, 0 |
| 4 | AP4 | 4, 3, 1, 2, 2, 0 |
| 5 | — | 4, 3, 1, 3, 1, 0 |
| 6 | — | 0, 0, 0, 0, 0, 0 |

The node maintains its association with AP3.

Figure 7:
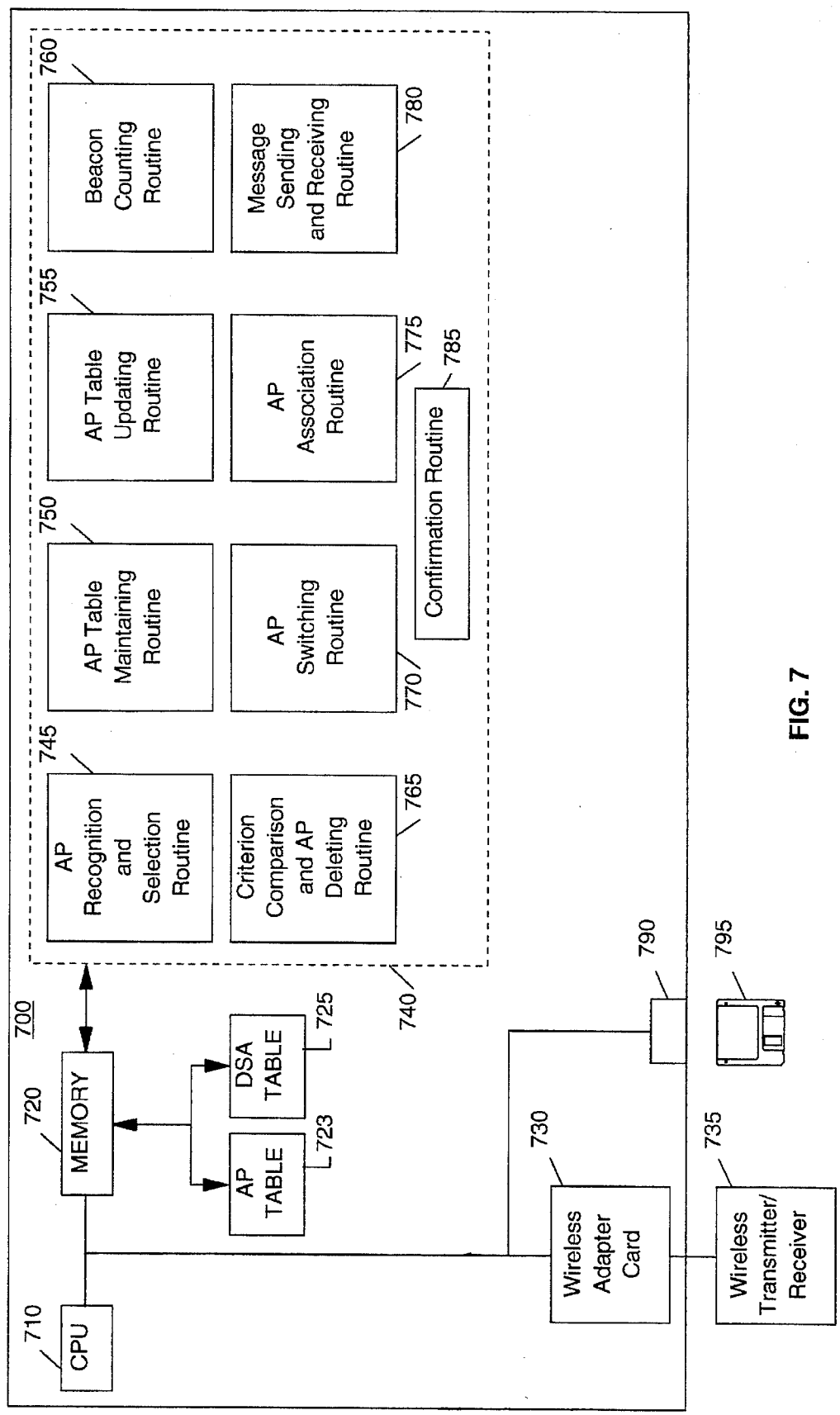
FIG. 7 is a block diagram schematically illustrating the components of a wireless node of the preferred embodiment of the present invention and its associated controller software.

FIG. 7 is a block diagram schematically illustrating the components of a wireless node of the preferred embodiment of the present invention and its associated software which carry out the above described operations. A wireless node 700 can take the form of a laptop computer equipped with a wireless adapter card 730 and a wireless transmitter/receiver 735. The wireless adapter card/transmitter/receiver is controlled by a CPU 710 which in turn carries out instructions from the various software routines selected from those within phantom box 740 which are loaded into the node's memory 720. The node's memory 720 also maintains the AP table 723 and the DSA table 725. Box 740 shows the software routines (or alternatively circuit equivalents) which comprises the controller for this node. Preferably the node includes disk drive 790 for installing the software from a disk 795.

The software routines 740 include an access point recognition and selection routine 745 for identifying messages received from an internetworking node and selecting data (i.e. the address of the internetworking node) from such messages; an access point table maintaining routine 750 for maintaining a table of internetworking nodes; an access point table updating routine 755 for updating the AP table each time the AP recognition and selection routines identifies a message from an internetworking node; a beacon counting routine 760 for counting the beacons for each AP in the AP table; a criterion comparison and AP deleting routine 765 for deleting from the AP table any internetworking node identified by the AP recognition and selection routine which does not meet a desired criterion (for example has not been heard within an interval in which any other internetworking node has been heard five times); an access point switching routine 770 for switching the association of the wireless node from one internetworking node to another; an access point association routine 775 for associating with an internetworking node; a message sending and receiving routine 780; and a confirmation routine 785.

Figure 8A:
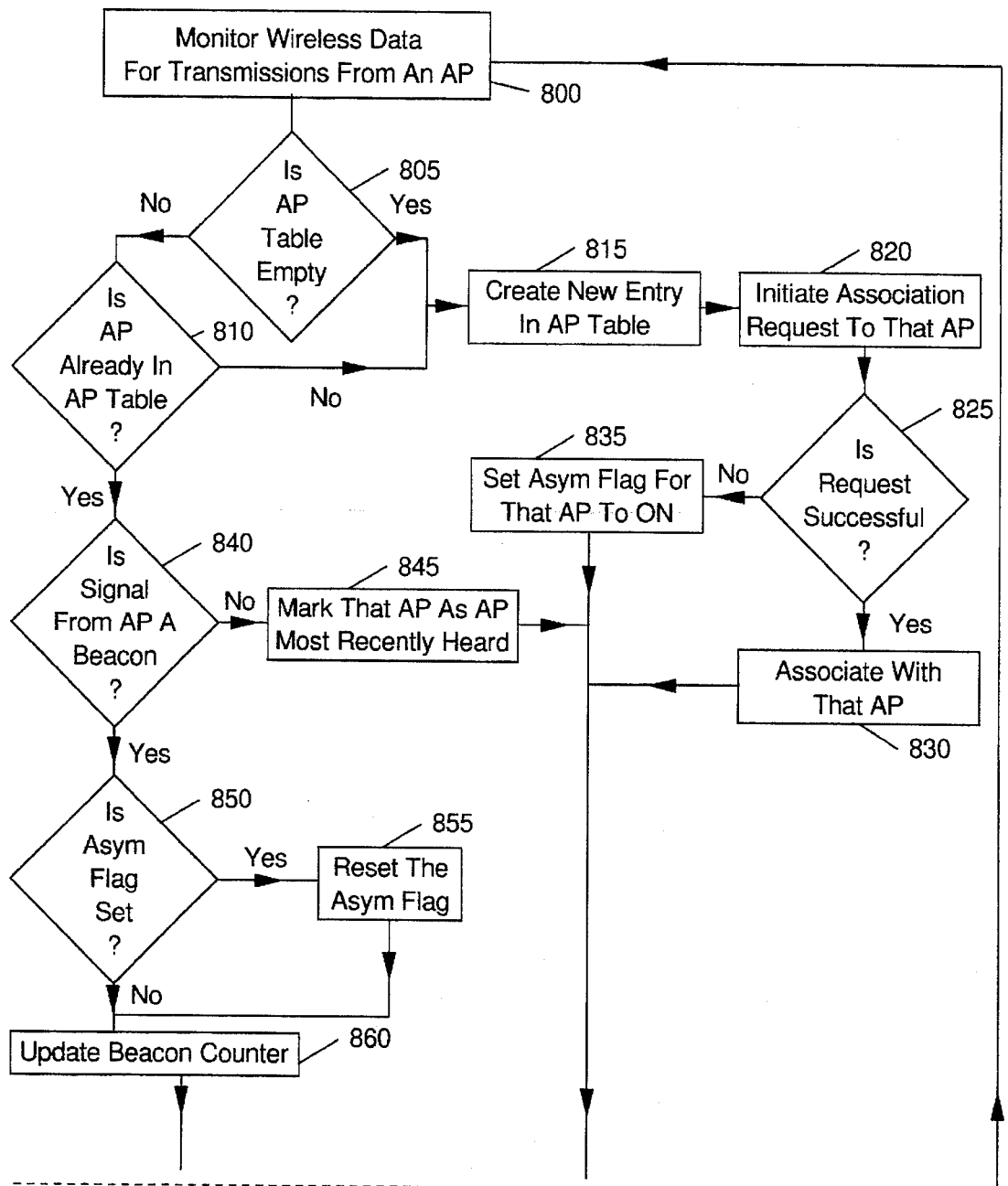
FIG. 8, consisting of FIGS. 8A and 8B, is a flow chart illustrating the steps taken by a wireless node of the preferred embodiment of the present invention upon receiving a transmission from an internetworking node (AP).
Figure 8B:
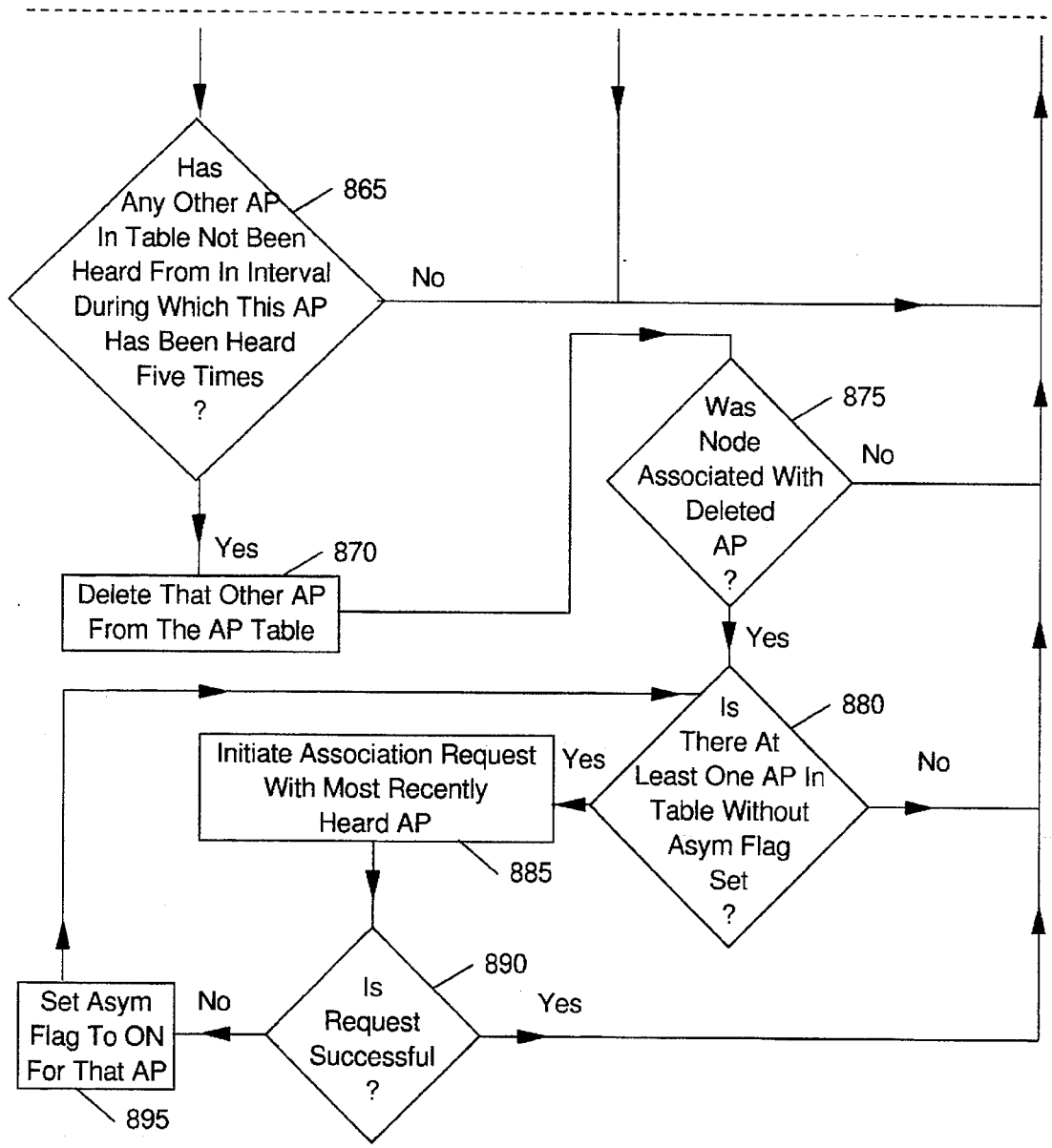

FIG. 8 is a simplified flow chart illustrating the steps taken by a wireless node upon receiving a transmission from an access point. As shown at step 800 a wireless node monitor wireless and data traffic within range for transmissions from an AP. The node then makes two determinations shown at 805 and 810 in order to determine whether an overheard access point has been heard for the first time. If so, either because the AP table was previously empty, or because the overheard AP was not in the AP table, the node creates a new entry in the access point table as shown at step 815. The node then initiates an association request to that AP as shown at step 820. The node then determines whether the request is successful at step 825 by evaluating whether it receives confirmation from the AP. If acknowledged the node then associates with the access point as shown at step 830, otherwise, as shown at step 835, the node sets the asym flag on for that AP because the AP apparently could not hear the node. The node then continues to monitor the wireless data traffic as shown at step 800.

If the determination at step 810 indicates that an overheard access point is already in the AP table, the node then determines at 840 whether the overheard signal is a beacon or a regular transmission. If the signal is a regular transmission (ie, not a beacon), the node then updates the AP table to indicate that the overheard AP is the most recently heard AP at step 845, and then continues to monitor the wireless data traffic.

If the signal is a beacon, the node then determines at 850 whether the asym flag has been set for that AP and if so resets the asym flag at 855. In any event the node updates the beacon counter for that AP in the AP table at step 860. Since the node has just heard a beacon from an AP, the node then determines whether any other AP should be decayed from its AP table at step 865. At step 865, the node determines whether any other AP in its table has not been heard during the interval that the overhead AP has been heard five times. If not the node returns to monitoring the wireless data. However if the determination at 865 is positive, the node then deletes that other AP from the AP table at step 870. The node then determines at 875 whether or not the node was associated with the deleted AP. If this is the case the node is then unassociated and attempts to associate with another AP. In order to do this, as shown at step 880, the node determines whether there is at least one AP in its table which does not have the asym flag set. If this is the case the node initiates an association routine with the AP in the AP table which is most recently heard, as shown at step 885. The node then determines whether the request is successful at 890 and if so associates with the AP and then continues to monitor the wireless data traffic. However, if no confirmation is received from the AP for which the association request is made at 885, the node then sets the asym flag on for that AP at step 895 and then once again attempts to determine, at 880, whether there is any other AP with which it can associate with.

Figure 9:
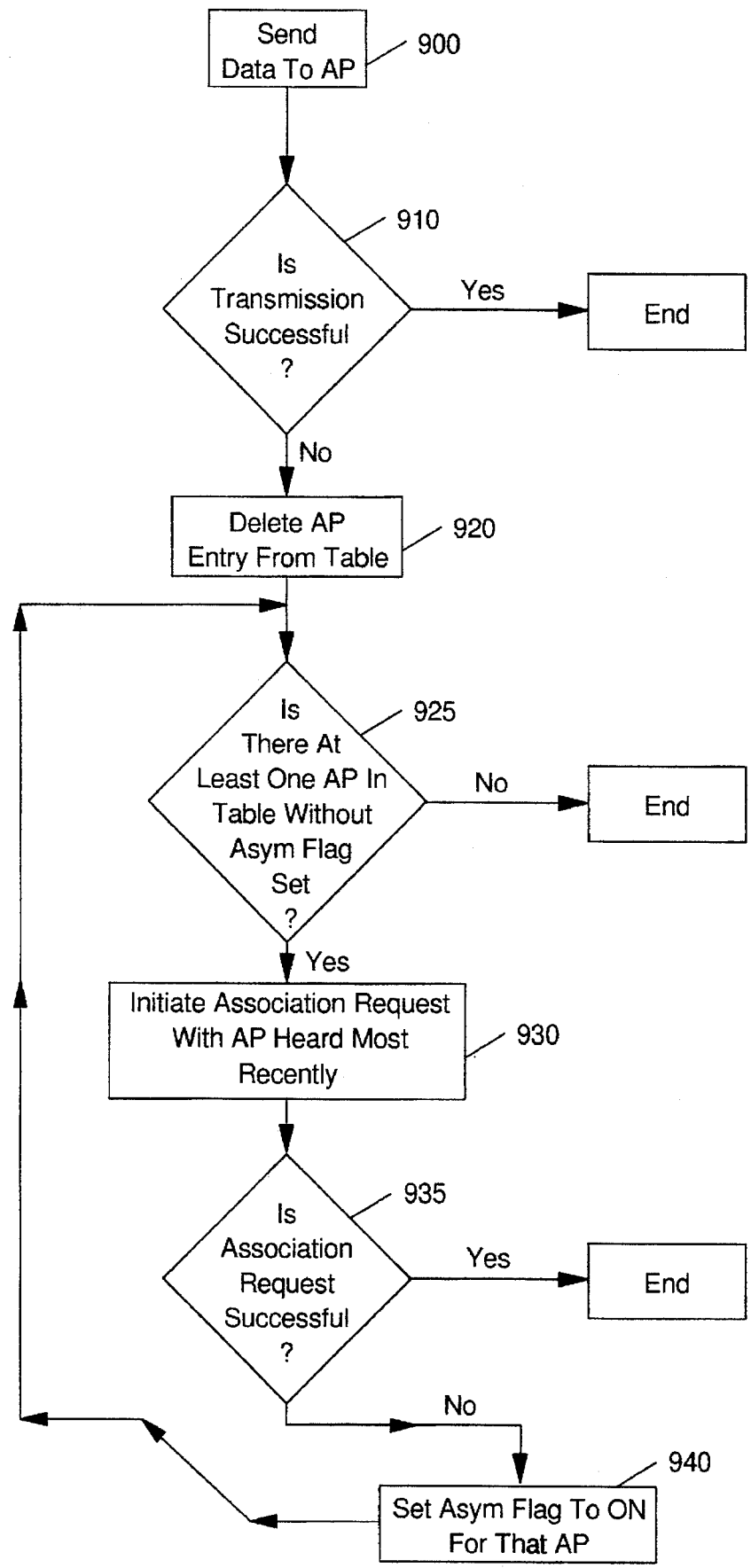
FIG. 9 is a flow chart illustrating the steps taken out by a wireless node of the preferred embodiment of the present invention in response to a command to send data to an internetworking node (AP).

FIG. 9 is a flow chart illustrating the steps taken by a node in trying to send data to an AP. At step 900 the node transmits data addressed to a particular AP. It then determines whether the AP acknowledges receipt of the transmission at step 910. If so the send procedure is complete. However if no acknowledgement is made the node assumes the access point is no longer within range and therefore deletes the access point entry from its AP table at step 920. The node then attempts to associate with another AP by making the determination, as shown at 925, whether there is at least one AP in its AP table without the asym flag set. If not the node cannot associate with an AP until it subsequently overhears a transmission from an AP. If the determination at 925 is positive the node attempts to initiate an association request with the AP in its AP table which has been heard most recently as indicated at step 930. The node then determines at 935 whether the association request is successful. If the AP acknowledges the association request the node is then associated with the AP and is done. However if the association request is not successful the node then sets the asym flag for that AP on at step 940 and once again attempts to make the determination at 925 as to whether any additional access point is available to associate with.

It will be apparent that many other changes may be made to the illustrative embodiments, while falling within the scope of the invention and it is intended that all such changes be covered by the claims appended hereto.

We claim:

1. A controller for a wireless node adapted to send data to and receive data from any of a plurality of internetworking nodes and to choose which of said internetworking nodes it will send data to and receive data from, said controller comprising:

means for maintaining a table of which internetworking nodes meet a first criterion that each internetworking node broadcast a beacon with its network address once in a predetermined period, and that the beacon of at least one internetworking node other than the first internetworking node shall be received by the wireless node a predetermined number of times greater than 1 after the last time that the wireless node shall have received the beacon of the first internetworking node;

means for associating said wireless node with a first internetworking node listed in the table so that, during the period of such association, it will send and receive data from said first internetworking node but not any other internetworking node; and switching means for disassociating said wireless node from said first internetworking node and associating it with a second internetworking node listed in the table when a second criterion is fulfilled.

2. A controller for a wireless node adapted to send data to and receive data from any of a plurality of internetworking nodes and to choose which of said internetworking nodes it will send data to and receive data from, said controller comprising:

a memory for maintaining a table of interconnecting nodes meeting a first criterion wherein data from each internetworking node in the table shall have been received by said wireless node within a prescribed period of time;

means for accessing the table for deleting interconnecting nodes not meeting a predefined tracking criterion;

means for associating said wireless node with a first internetworking node listed in the table so that, during the period of such association, it will send and receive data from said first internetworking node but not any other internetworking node; and switching means for disassociating said wireless node from said first internetworking node and associating it with a second internetworking node listed in the table when a second criterion is fulfilled whereby the prescribed period of time is chosen with respect to the likelihood of relative movement and likely speed of movement between the wireless node and the internetworking node and frequency of data transmission from said internetworking node such that said internetworking node is likely to be removed from the table for failure to meet the first criterion after it and the wireless node are no longer within data-exchanging range.

3. A controller for a wireless node adapted to send data to and receive data from any of a plurality of internetworking nodes and to choose which of said internetworking nodes it will send data to and receive data from, said controller comprising:

a memory for maintaining a table of interconnecting nodes meeting a first criterion wherein each internetworking node broadcast a beacon with its network address once in a predetermined period, and that such beacon from each internetworking node in the table shall have been received by said wireless node within a prescribed period of time, the prescribed period being at least as long as the predetermined period;

means for accessing the table for deleting interconnecting nodes not meeting a predefined tracking criterion;

means for associating said wireless node with a first internetworking node listed in the table so that, during the period of such association, it will send and receive data from said first internetworking node but not any other internetworking node; and switching means for disassociating said wireless node from said first internetworking node and associating it with a second internetworking node listed in the table when a second criterion is fulfilled whereby the prescribed period of time and the predetermined period are chosen with respect to the likelihood of relative movement and likely speed of movement between the wireless node and the internetworking node such that said internetworking node is likely to be removed from the table for failure to meet the first criterion after it and the wireless node are no longer within data-exchanging range.

4. A controller for a wireless node adapted to send data to and receive data from any of a plurality of internetworking nodes and to choose which of said internetworking nodes it will send data to and receive data from, said controller comprising:

means for maintaining a table of which internetworking nodes meet a first criterion that data from each internetworking node in the table shall have been received by said wireless node within a prescribed period of time;

means for associating said wireless node with a first internetworking node listed in the table so that, during the period of such association, it will send and receive data from said first internetworking node but not any other internetworking node; and switching means for disassociating said wireless node from said first internetworking node and associating it with a second internetworking node listed in the table when a second criterion that the second internetworking node shall have been added to the table since the time of association of the wireless node with the first internetworking node is fulfilled.

5. A controller for a wireless node adapted to send data to and receive data from any of a plurality of internetworking nodes and to choose which of said internetworking nodes it will send data to and receive data from, said controller comprising:

a memory for maintaining a table of interconnecting nodes meeting a first criterion wherein data from each internetworking node in the table shall have been received by said wireless node within a prescribed period of time;

means for accessing the table for deleting interconnecting nodes not meeting a predefined tracking criterion;

means for associating said wireless node with a first internetworking node listed in the table so that, during the period of such association, it will send and receive data from said first internetworking node but not any other internetworking node; and switching means for disassociating said wireless node from said first internetworking node and associating it with a second internetworking node listed in the table when a second criterion is fulfilled wherein said second criterion being that the first and second internetworking nodes shall both be in the table, and the wireless node shall have been unable on at least one occasion to send data to the first internetworking node and receive back from said first internetworking node an acknowledgement that such data had been received successfully.

6. A controller for a wireless node adapted to send data to and receive data from any of a plurality of internetworking nodes and to choose which of said internetworking nodes it will send data to and receive data from, said controller comprising:

means for maintaining a table of which internetworking nodes meet a first criterion that each internetworking node broadcast a beacon with its network address once in a predetermined period, and that the beacon of at least one internetworking node other than the first internetworking node shall be received by a wireless node a predetermined number of times greater than 1 after the last time that the wireless node shall have received the beacon of the first internetworking node;

means for associating said wireless node with a first internetworking node listed in the table so that, during the period of such association, it will send and receive data from said first internetworking node but not any other internetworking node; and switching means for disassociating said wireless node from said first internetworking node and associating it with a second internetworking node listed in the table when a second criterion that the first internetworking node shall not be in the table is fulfilled.

7. A computer program product for use with a wireless node having a CPU, memory, and a wireless adapter card equiped with a wireless receiver/transmitter, said computer program product comprising:

a recording medium;

means recorded on said recording medium for establishing, on said wireless node, the controller of claim 6.

8. A controller for a wireless node adapted to send data to and receive data from any of a plurality of internetworking nodes and to choose which of said internetworking nodes it will send data to and receive data from, said controller comprising:

means for maintaining a table of which internetworking nodes meet a first criterion that each internetworking broadcast a beacon with its network address once in a predetermined period, and that the beacon of at least one internetworking node other than the first internetworking node shall be received by a wireless node a predetermined number of times greater than 1 after the last time that the wireless node shall have received the beacon of the first internetworking node;

means for associating said wireless node with a first internetworking node listed in the table so that, during the period of such association, it will send and receive data from said first internetworking node but not any other internetworking node; and switching means for disassociating said wireless node from said first internetworking node and associating it with a second internetworking node listed in the table when a second criterion that the second internetworking node shall have been added to the table since the time of association of the wireless node with the first internetworking node is fulfilled.

9. A computer program product for use with a wireless node having a CPU, memory, and a wireless adapter card equiped with a wireless receiver/transmitter, said computer program product comprising:

a recording medium;

means recorded on said recording medium for establishing, on said wireless node, the controller of claim 8.

10. A controller for a wireless node adapted to send data to and receive data from any of a plurality of internetworking nodes and to choose which of said internetworking nodes it will send data to and receive data from, said controller comprising:

means for maintaining a table of which internetworking nodes meet a first criterion that each internetworking node broadcast a beacon with its network address once in a predetermined period, and that the beacon of at least one internetworking node other than the first internetworking node shall be received by a wireless node a predetermined number of times greater than 1 after the last time that the wireless node shall have received the beacon of the first internetworking node;

means for associating said wireless node with a first internetworking node listed in the table so that, during the period of such association, it will send and receive data from said first internetworking node but not any other internetworking node; and switching means for disassociating said wireless node from said first internetworking node and associating it with a second internetworking node listed in the table when a second criterion that the first and second internetworking nodes shall both be in the table, and the wireless node shall have been unable on at least one occasion to send data to the first internetworking node and receive back from said first internetworking node an acknowledgement that such data had been received successfully is fulfilled.

11. A computer program product for use with a wireless node having a CPU, memory, and a wireless adapter card equiped with a wireless receiver/transmitter, said computer program product comprising:

a recording medium;

means recorded on said recording medium for establishing, on said wireless node, the controller of claim 10.

12. A method of selecting one of a plurality of internetworking nodes to and from which a wireless node is to send data comprising:

maintaining a table of which internetworking nodes meet a first criterion that each internetworking node broadcast a beacon with its network address once in a predetermined period and that the beacon of at least one internetworking node other than the first internetworking node shall be received by the wireless node a predetermined number of times greater than 1 after the last time that the wireless node shall have received the beacon of the first internetworking node;

associating said wireless node with a first internetworking node in that table so that, during the period of such association, it will send and receive data from said first internetworking node but not any other internetworking node; and disassociating said wireless node form said first internetworking node and associating it with a second internetworking node listed in the table when a second criterion is fulfilled.

13. A method as claimed in claim 12 in which said second criterion is that the second internetworking node shall have been added to the table since the time of association of the wireless node with the first internetworking node.

14. A method of selecting one of a plurality of internetworking nodes to and from which a wireless node is to send data comprising:

maintaining a table of internetworking nodes meeting a first criterion that data from each internetworking node in the table shall have been received by said wireless node within a prescribed period of time being chosen with respect to the likelihood of relative movement and likely speed of movement between the wireless node and the internetworking node and frequency of data transmission from said internetworking node such that said internetworking node is likely to be removed from the table for failure to meet the first criterion after it and the wireless node are no longer within data-exchanging range;

accessing said table and deleting interconnecting nodes not meeting a predefined tracking criterion;

associating said wireless node with a first internetworking node in the table so that, during the period of such association, it will send and receive data from said first internetworking node but not any other internetworking node; and disassociating said wireless node from said first internetworking node and associating it with a second internetworking node listed in the table when a second criterion is fulfilled.

15. A method of selecting one of a plurality of internetworking nodes to and from which a wireless node is to send data comprising:

maintaining a table of internetworking nodes meeting a first criterion being that each internetworking node broadcast a beacon with its network address once in a predetermined period, and that such beacon from each internetworking node in the table shall have been received by said wireless node within a prescribed period of time, the prescribed period being at least as long as the predetermined period; and the prescribed period of time and the predetermined period are chosen with respect to the likelihood of relative movement and likely speed of movement between the wireless node and the internetworking node such that said internetworking node is likely to be removed from the table for failure to meet the first criterion after it and the wireless node are no longer within data-exchanging range;

accessing said table and deleting interconnecting nodes not meeting a predefined tracking criterion;

associating said wireless node with a first internetworking node in the table so that, during the period of such association, it will send and receive data from said first internetworking node but not any other internetworking node; and disassociating said wireless node from said first internetworking node and associating it with a second internetworking node listed in the table when a second criterion is fulfilled.

16. A method of selecting one of a plurality of internetworking nodes to and from which a wireless node is to send data comprising:

maintaining a table of which internetworking nodes meet a first criterion that data from each internetworking node in the table shall have been received by said wireless node within a prescribed period of time;

associating said wireless node with a first internetworking node in the table so that, during the period of such association, it will send and receive data from said first internetworking node but not any other internetworking node; and disassociating said wireless node form said first internetworking node and associating it with a second internetworking node listed in the table when a second criterion that the second internetworking node shall have been added to the table since the time of association of the wireless node with the first internetworking node is fulfilled.

17. A method of selecting one of a plurality of internetworking nodes to and from which a wireless node is to send data comprising:

maintaining a table of internetworking nodes which meet a first criterion being that data from each internetworking node in the table shall have been received by said wireless node within a prescribed period of time;

accessing said table and deleting interconnecting nodes not meeting a predefined tracking criterion;

associating said wireless node with a first internetworking node in the table so that, during the period of such association, it will send and receive data from said first internetworking node but not any other internetworking node; and disassociating said wireless node from said first internetworking node and associating it with a second internetworking node listed in the table when a second criterion is fulfilled, wherein said second criterion being that the first and second internetworking nodes shall both be in the table, and the wireless node shall have been unable on at least one occasion to send data to the first internetworking node and receive back from said first internetworking node an acknowledgement that such data has been received successfully.

18. A method of selecting one of a plurality of internetworking nodes to and from which a wireless node is to send data comprising:

maintaining a table of which internetworking nodes meet a first criterion that each internetworking node broadcast a beacon with its network address once in a predetermined period and that the beacon of at least one internetworking node other than the first internetworking node shall be received by the wireless node a predetermined number of times greater than 1 after the last time that the wireless node shall have received the beacon of the first internetworking node;

associating said wireless node with a first internetworking node in that table so that, during the period of such association, it will send and receive data from said first internetworking node but not any other internetworking node; and disassociating said wireless node from said first internetworking node and associating it with a second internetworking node listed in the table when a second criterion that the first internetworking node shall not be in the table is fulfilled.

19. A method of selecting one of a plurality of internetworking nodes to and from which a wireless node is to send data comprising:

maintaining a table of which internetworking nodes meet a first criterion that each internetworking node broadcast a beacon with its network address once in a predetermined period and that the beacon of at least one internetworking node other than the first internetworking node shall be received by the wireless node a predetermined number of times greater than 1 after the last time that the wireless node shall have received the beacon of the first internetworking node;

associating said wireless node with a first internetworking node in that table so that, during the period of such association, it will send and receive data from said first internetworking node but not any other internetworking node; and disassociating said wireless node from said first internetworking node and associating it with a second internetworking node listed in the table when a second criterion that the first and second internetworking node shall both be in the table, and the wireless node shall have been unable on at least one occasion to send data to the first internetworking node and receive back from said first internetworking node an acknowledgement that such data had been received successfully is fulfilled.

* * * * *